US011296475B2

(12) United States Patent
Dilmaghanian et al.

(10) Patent No.: US 11,296,475 B2
(45) Date of Patent: *Apr. 5, 2022

(54) CONNECTOR HOUSINGS, USE OF, AND METHOD THEREFOR

(71) Applicant: Bal Seal Engineering, LLC, Foothill Ranch, CA (US)

(72) Inventors: Farshid Dilmaghanian, Rancho Santa Margarita, CA (US); Peter J. Balsells, Newport Beach, CA (US); Majid Ghasiri, Foothill Ranch, CA (US); Derek Changsrivong, Costa Mesa, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/438,306

(22) Filed: Jun. 11, 2019

(65) Prior Publication Data

US 2019/0296511 A1    Sep. 26, 2019

Related U.S. Application Data

(60) Continuation of application No. 14/990,388, filed on Jan. 7, 2016, now Pat. No. 10,361,528, which is a (Continued)

(51) Int. Cl.
*F16B 17/00* (2006.01)
*H01R 4/48* (2006.01)
(Continued)

(52) U.S. Cl.
CPC ............ *H01R 43/18* (2013.01); *B23K 11/115* (2013.01); *B23K 11/16* (2013.01); *B23K 11/18* (2013.01);
(Continued)

(58) Field of Classification Search
CPC .. H01R 43/18; H01R 13/6277; H01R 4/4863; H01R 13/187; H01R 24/58;
(Continued)

(56) References Cited

U.S. PATENT DOCUMENTS

| 3,174,500 A | 3/1965 | Johnson et al. |
| 4,655,462 A | 4/1987 | Balsells |

(Continued)

FOREIGN PATENT DOCUMENTS

| DE | 19807663 | 9/1999 |
| EP | 2387113 A2 | 11/2011 |

(Continued)

OTHER PUBLICATIONS

International Preliminary Report on Patentability on corresponding PCT application (PCT/US2013/059526) from International Searching Authority (KR) dated Mar. 26, 2015.

(Continued)

*Primary Examiner* — Sarang Afzali
*Assistant Examiner* — Darrell C Ford
(74) *Attorney, Agent, or Firm* — Klein, O'Neill & Singh, LLP

(57) ABSTRACT

A method of making a connector assembly includes attaching two stamped housing sections together to form a connector housing having a housing groove with a groove bottom and two side walls and providing the connector housings with a spring used as a mechanical connector and/or as an electrical connector for numerous applications and across numerous industries. The groove geometries can easily be altered using different stamping dies.

24 Claims, 12 Drawing Sheets

Related U.S. Application Data division of application No. 14/025,682, filed on Sep. 12, 2013, now Pat. No. 9,284,970.

(60) Provisional application No. 61/701,404, filed on Sep. 14, 2012.

(51) Int. Cl.
| | | |
|---|---|---|
| H01R 13/187 | (2006.01) | |
| H01R 24/58 | (2011.01) | |
| B23K 101/18 | (2006.01) | |
| B23K 103/04 | (2006.01) | |
| B23K 103/08 | (2006.01) | |
| B23K 103/14 | (2006.01) | |
| B23K 103/00 | (2006.01) | |
| H01R 13/24 | (2006.01) | |
| H01R 43/16 | (2006.01) | |
| F16F 1/04 | (2006.01) | |
| H01R 43/18 | (2006.01) | |
| H01R 13/627 | (2006.01) | |
| F16B 21/18 | (2006.01) | |
| B23K 26/32 | (2014.01) | |
| B23K 11/11 | (2006.01) | |
| B23K 11/16 | (2006.01) | |
| B23K 11/18 | (2006.01) | |
| B23K 26/24 | (2014.01) | |
| F16B 5/08 | (2006.01) | |
| B23K 103/12 | (2006.01) | |

(52) U.S. Cl.
CPC .............. *B23K 26/24* (2013.01); *B23K 26/32* (2013.01); *F16B 17/00* (2013.01); *F16B 21/186* (2013.01); *F16F 1/045* (2013.01); *H01R 4/4863* (2013.01); *H01R 13/187* (2013.01); *H01R 13/6277* (2013.01); *H01R 24/58* (2013.01); *B23K 2101/18* (2018.08); *B23K 2103/04* (2018.08); *B23K 2103/05* (2018.08); *B23K 2103/08* (2018.08); *B23K 2103/12* (2018.08); *B23K 2103/14* (2018.08); *B23K 2103/50* (2018.08); *F16B 5/08* (2013.01); *F16B 2200/50* (2018.08); *H01R 13/2421* (2013.01); *H01R 43/16* (2013.01); *H01R 2201/12* (2013.01); *Y10T 29/49826* (2015.01); *Y10T 403/52* (2015.01); *Y10T 403/587* (2015.01); *Y10T 403/604* (2015.01); *Y10T 403/70* (2015.01)

(58) Field of Classification Search
CPC ........... H01R 2201/12; H01R 13/2421; H01R 43/16; F16F 1/045; F16B 21/186; F16B 17/00; F16B 2200/50; F16B 5/08; B23K 26/32; B23K 11/115; B23K 11/16; B23K 11/18; B23K 26/24; B23K 2103/05; B23K 2103/12; B23K 2101/18; B23K 2103/04; B23K 2103/08; B23K 2103/14; B23K 2103/50; Y10T 403/587; Y10T 29/49826; Y10T 403/604; Y10T 403/52; Y10T 403/70
USPC .................. 29/453, 463, 428, 434, 527.1
See application file for complete search history.

(56) References Cited

U.S. PATENT DOCUMENTS

| | | |
|---|---|---|
| 4,678,210 A | 7/1987 | Balsells |
| 4,826,144 A | 5/1989 | Balsells |
| 4,830,344 A | 5/1989 | Balsells |
| 4,872,710 A | 10/1989 | Konecny et al. |
| 4,876,781 A | 10/1989 | Balsells |
| 4,893,795 A | 1/1990 | Balsells |
| 4,907,788 A | 3/1990 | Balsells |
| 4,915,366 A | 4/1990 | Balsells |
| 4,934,666 A | 6/1990 | Balsells |
| 4,961,253 A | 10/1990 | Balsells |
| 4,964,204 A | 10/1990 | Balsells |
| 4,974,821 A | 12/1990 | Balsells |
| 5,108,078 A | 4/1992 | Balsells |
| 5,139,243 A | 8/1992 | Balsells |
| 5,139,276 A | 8/1992 | Balsells |
| 5,146,811 A | 9/1992 | Jackel |
| 5,149,642 A | 9/1992 | Mazur et al. |
| 5,160,122 A | 11/1992 | Balsells |
| 5,171,161 A * | 12/1992 | Kachlic ............ H01R 13/6275 439/352 |
| 5,184,962 A * | 2/1993 | Noschese ............ H01R 12/714 439/591 |
| 5,203,849 A | 4/1993 | Balsells |
| 5,219,045 A * | 6/1993 | Porter ................... F16B 7/1481 188/67 |
| 5,236,375 A * | 8/1993 | Kachlic ............ H01R 13/6275 439/607.13 |
| 5,239,737 A | 8/1993 | Balsells |
| 5,411,348 A | 5/1995 | Balsells |
| 5,435,915 A | 7/1995 | Connors |
| 5,435,925 A | 7/1995 | Jamison |
| 5,503,375 A | 4/1996 | Balsells |
| 5,545,842 A | 8/1996 | Balsells |
| 5,570,719 A | 11/1996 | Richards et al. |
| 5,709,371 A | 1/1998 | Balsells |
| 5,791,638 A | 8/1998 | Balsells |
| 6,056,099 A | 5/2000 | Jackel |
| 6,095,874 A * | 8/2000 | Quaranta ............ H01R 13/11 439/843 |
| 6,672,565 B2 | 1/2004 | Russell |
| 6,835,084 B2 | 12/2004 | Poon et al. |
| 6,895,276 B2 | 5/2005 | Kast et al. |
| 7,055,812 B2 | 6/2006 | Balsells |
| 7,108,112 B2 | 9/2006 | Mizukami |
| 7,299,095 B1 | 11/2007 | Barlow et al. |
| 7,458,862 B2 | 12/2008 | Zhao et al. |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 7,928,618 B2 | 4/2011 | Melodia |
| 7,985,105 B2 | 7/2011 | Balsells |
| 8,052,459 B2 | 11/2011 | Smith et al. |
| 8,096,842 B2 | 1/2012 | Poon et al. |
| 8,308,167 B2 | 11/2012 | Balsells et al. |
| 8,336,864 B2 | 12/2012 | Noh |
| 8,382,532 B2 | 2/2013 | Sjostedt et al. |
| 8,428,724 B2 | 4/2013 | Sage |
| 8,491,346 B2 | 7/2013 | Sjostedt et al. |
| 8,561,274 B2 | 10/2013 | Balsells |
| 8,590,867 B2 | 11/2013 | Leon |
| 9,004,805 B2 | 4/2015 | Changsrivong et al. |
| 9,267,526 B2 | 2/2016 | Balsells |
| 9,273,742 B2 | 3/2016 | Balsells et al. |
| 9,284,970 B2 | 3/2016 | Dilmaghanian et al. |
| 9,312,630 B2 | 4/2016 | Huang |
| 9,482,255 B2 | 11/2016 | Changsrivong et al. |
| 9,500,211 B2 | 11/2016 | Changsrivong |
| 9,518,626 B2 | 12/2016 | Balsells et al. |
| 9,534,625 B2 | 1/2017 | Balsells |
| 9,677,587 B2 | 6/2017 | Changsrivong et al. |
| 10,992,073 B1 * | 4/2021 | Probert ................ H01R 13/08 |
| 11,035,397 B2 * | 6/2021 | Balsells ................. F16L 37/22 |
| 2002/0122690 A1 | 9/2002 | Poon et al. |
| 2003/0094812 A1 | 5/2003 | Balsells |
| 2003/0096526 A1 | 5/2003 | Balsells |
| 2004/0167582 A1 | 8/2004 | Tvaska |
| 2005/0027327 A1 | 2/2005 | Ries et al. |
| 2005/0186829 A1 | 8/2005 | Balsells |
| 2005/0250367 A1 * | 11/2005 | Scholz ................ H01R 12/707 439/342 |

(56) References Cited

U.S. PATENT DOCUMENTS

| | | | |
|---|---|---|---|
| 2006/0035538 A1* | 2/2006 | Suemitsu | H01R 13/187 439/852 |
| 2006/0228166 A1 | 10/2006 | Balsells | |
| 2006/0270277 A1 | 11/2006 | Zhao | |
| 2006/0270286 A1 | 11/2006 | Zhao | |
| 2007/0100386 A1 | 5/2007 | Tronnes et al. | |
| 2008/0246231 A1 | 10/2008 | Sjostedt et al. | |
| 2010/0029145 A1 | 2/2010 | Balsells et al. | |
| 2010/0279558 A1 | 11/2010 | Leon et al. | |
| 2010/0289198 A1 | 11/2010 | Balsells et al. | |
| 2011/0003507 A1* | 1/2011 | Van Swearingen | B29C 45/16 439/578 |
| 2011/0280653 A1* | 11/2011 | Sjostedt | H01R 13/187 403/361 |
| 2011/0281476 A1 | 11/2011 | Sjostedt | |
| 2012/0213575 A1 | 8/2012 | Balsells | |
| 2012/0299352 A1 | 11/2012 | Line et al. | |
| 2013/0149031 A1 | 6/2013 | Changsrivong et al. | |
| 2014/0130329 A1 | 5/2014 | Changsrivong et al. | |
| 2014/0162487 A1 | 6/2014 | Frederick et al. | |
| 2014/0259617 A1 | 9/2014 | Kompa et al. | |
| 2014/0378008 A1 | 12/2014 | Young et al. | |
| 2015/0240900 A1 | 8/2015 | Poon et al. | |
| 2015/0316115 A1 | 11/2015 | Carter | |
| 2016/0076568 A1 | 3/2016 | Dilmaghanian et al. | |
| 2016/0204557 A1 | 7/2016 | Kim | |
| 2016/0265574 A1 | 9/2016 | Ghasiri | |
| 2017/0352984 A1 | 12/2017 | Changsrivong et al. | |
| 2017/0373425 A1 | 12/2017 | Rust | |
| 2018/0375244 A1 | 12/2018 | Wagman | |
| 2021/0044047 A1* | 2/2021 | Busies | H01R 13/6273 |
| 2021/0053517 A1* | 2/2021 | Baas | B23K 26/322 |
| 2021/0066861 A1* | 3/2021 | Bergner | H01R 13/40 |
| 2021/0165020 A1* | 6/2021 | Schrodi | G01R 1/06722 |

FOREIGN PATENT DOCUMENTS

| | | |
|---|---|---|
| EP | 2497527 A2 | 9/2012 |
| GB | 2194298 | 3/1988 |
| WO | WO 03067713 | 8/2003 |

OTHER PUBLICATIONS

International Search Report completed Nov. 27, 2013 and dated Dec. 2, 2013 from corresponding International Application No. PCT/US2013/059526 filed Sep. 12, 2013 (3 pages).

Written Opinion completed Nov. 27, 2013 and dated Dec. 2, 2013 from corresponding International Application No. PCT/US2013/059526 filed Sep. 12, 2013 (5 pages).

Extended European Search Report from European Patent Office on corresponding EP application (EP13836767.7) dated May 2, 2016.

Non-Final Office Action on corresponding US application (U.S. Appl. No. 14/025,682) dated Mar. 30, 2015.

Final Office Action on corresponding US application (U.S. Appl. No. 14/025,682) dated Oct. 16, 2015.

Non-Final Office Action on co-pending US application (U.S. Appl. No. 14/990,388) dated Feb. 22, 2018.

Non-Final Office Action on co-pending US application (U.S. Appl. No. 14/990,388) dated Nov. 1, 2018.

Notice of Allowance on co-pending US application (U.S. Appl. No. 14/990,388) dated Mar. 12, 2019.

Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).

Latching and Holding With Bal Seal Canted-Coil Circular Welding Springs, Product News #164D, Nov. 23, 1991, Bal Seal Engineering Company, Inc., Santa Ana, California, U.S.A., (6 pages).

* cited by examiner

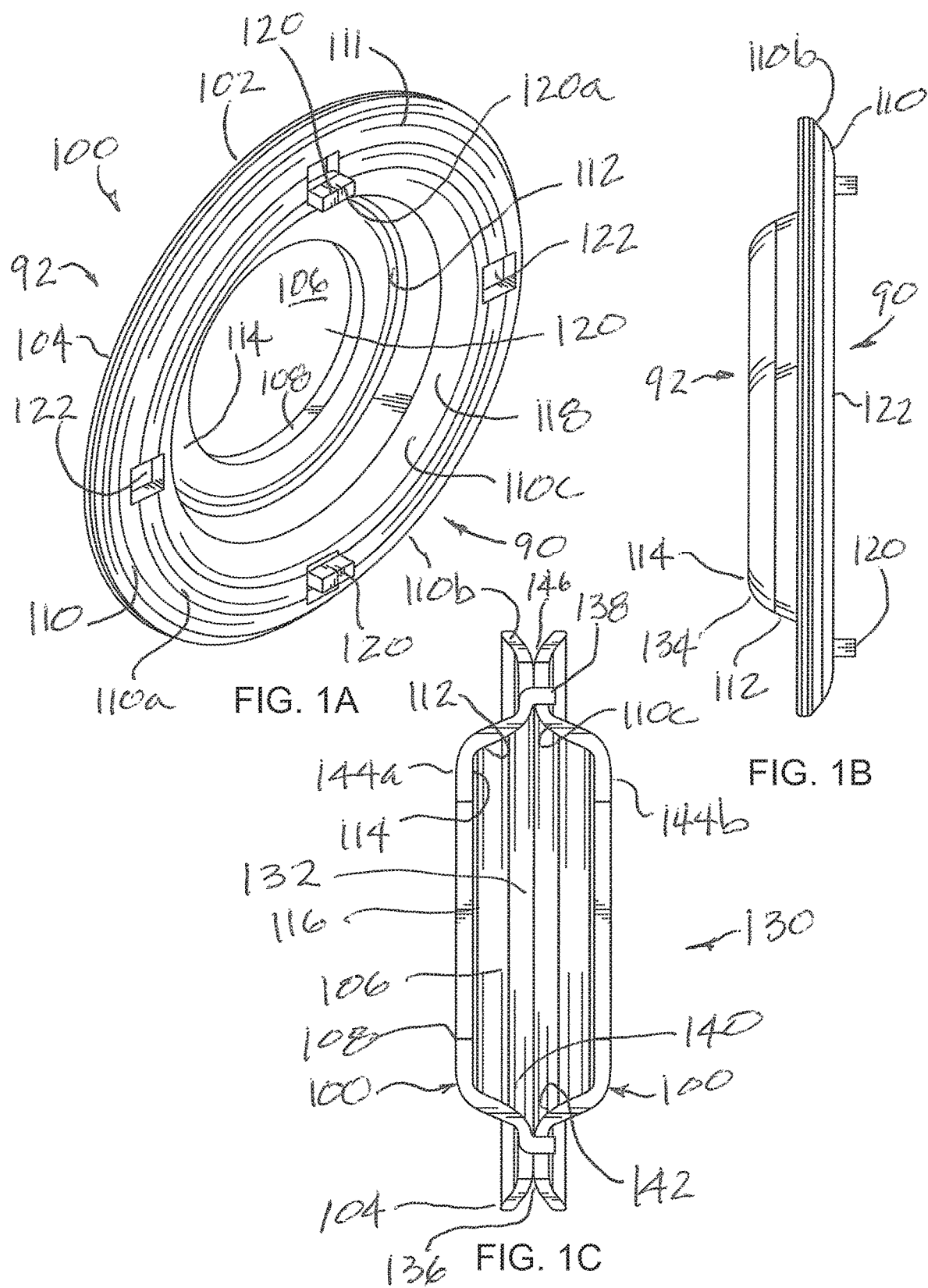

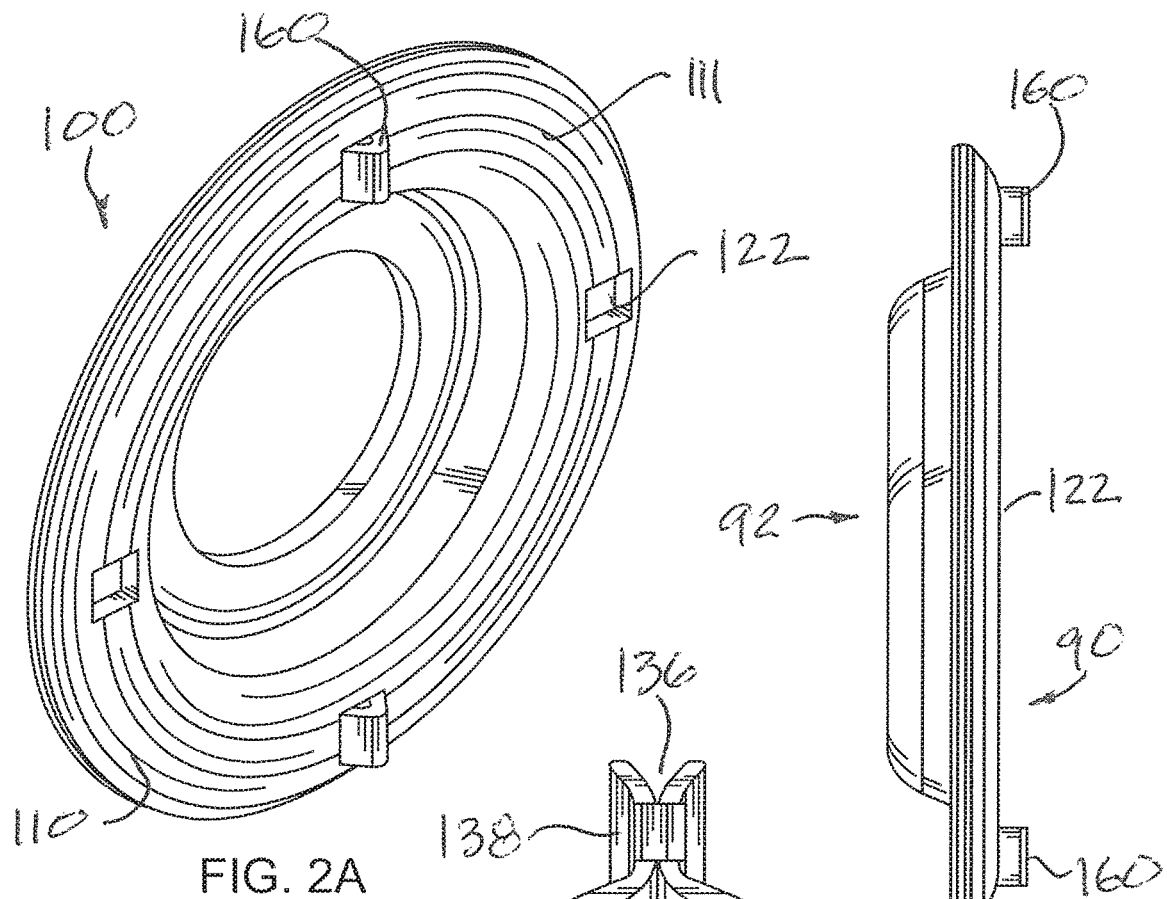
FIG. 2A
FIG. 2B
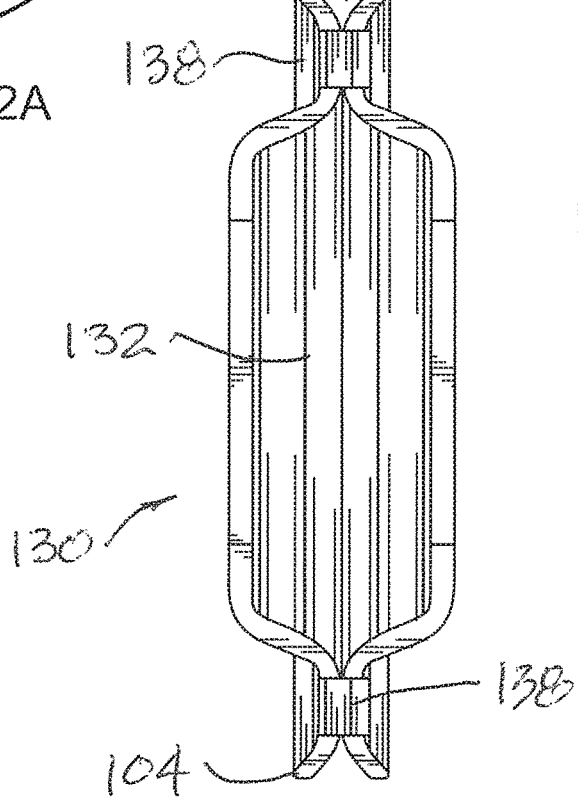
FIG. 2C

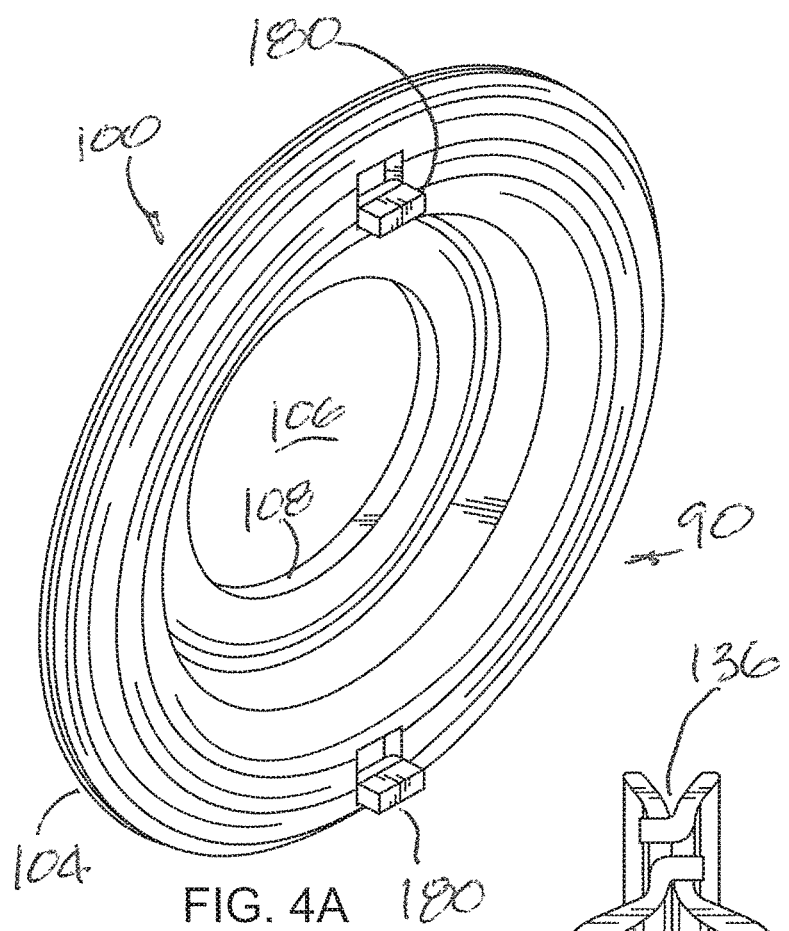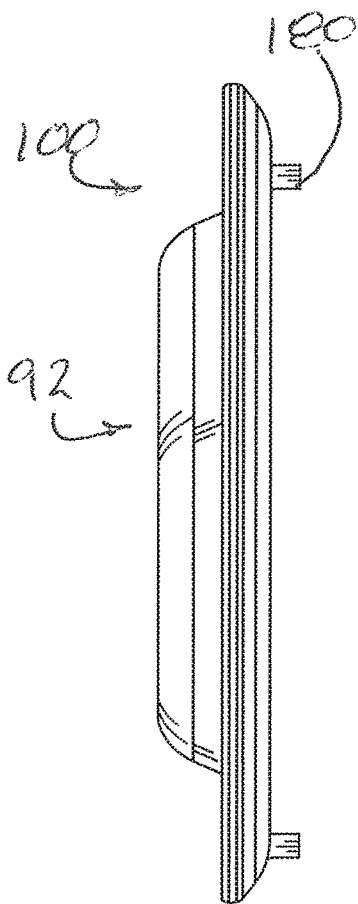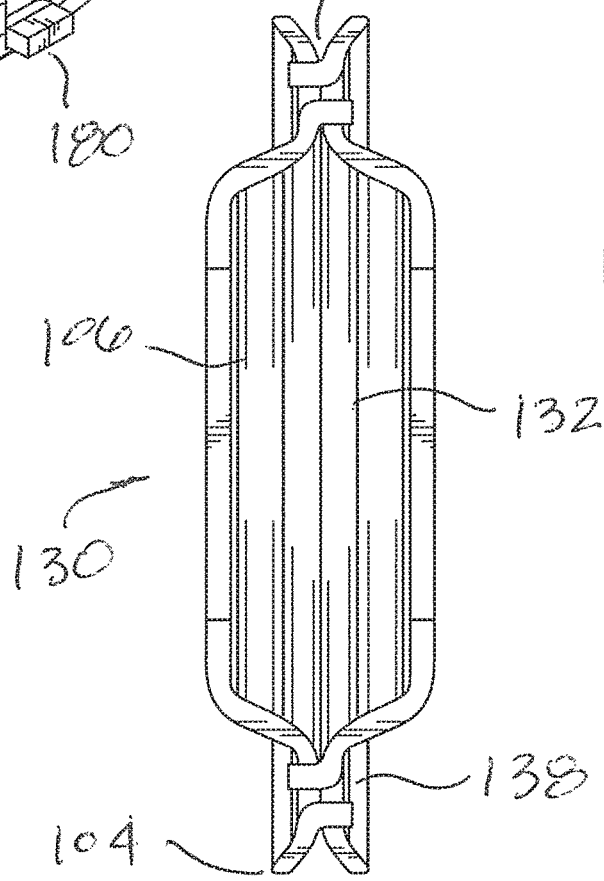
FIG. 4A
FIG. 4B
FIG. 4C

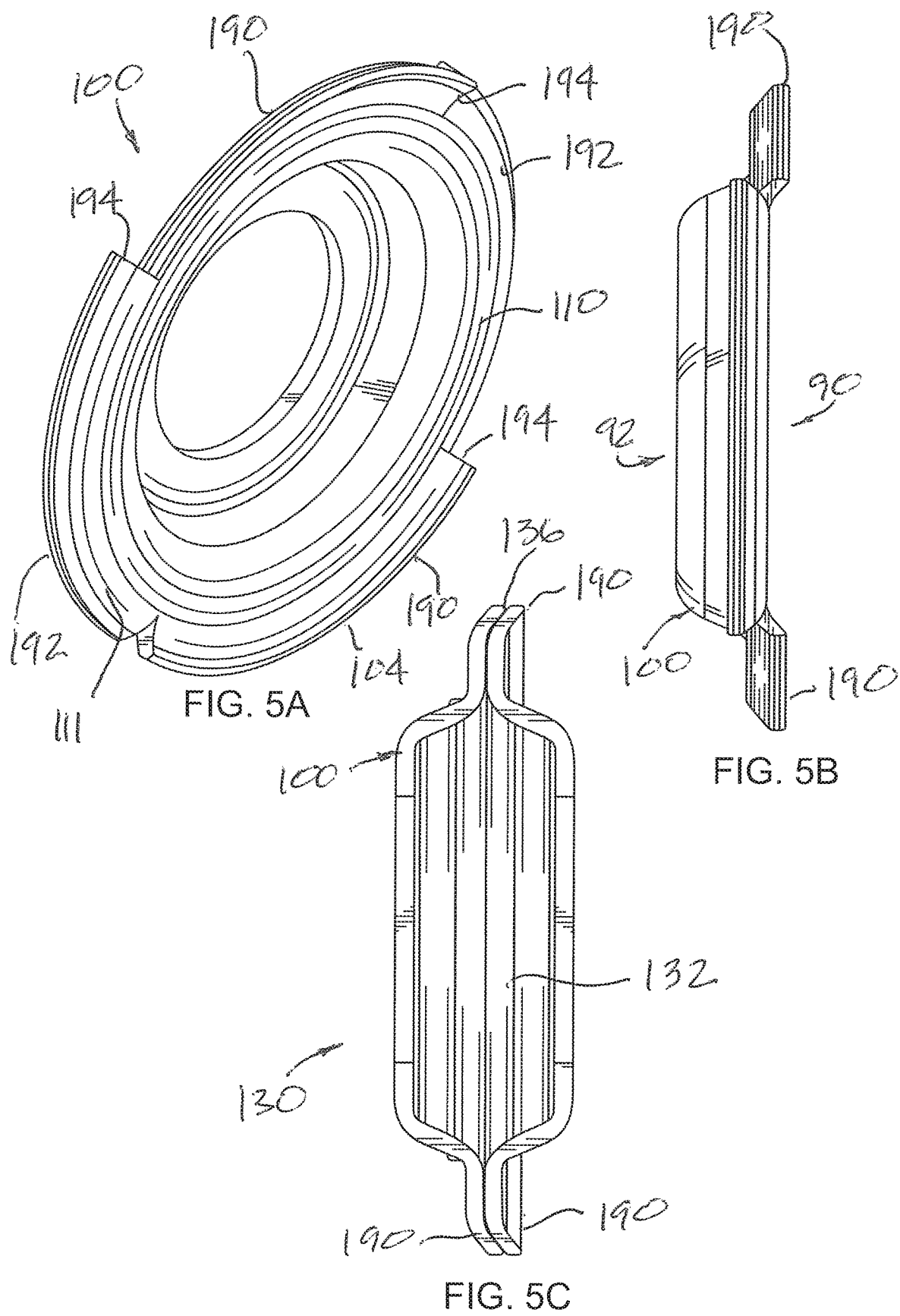

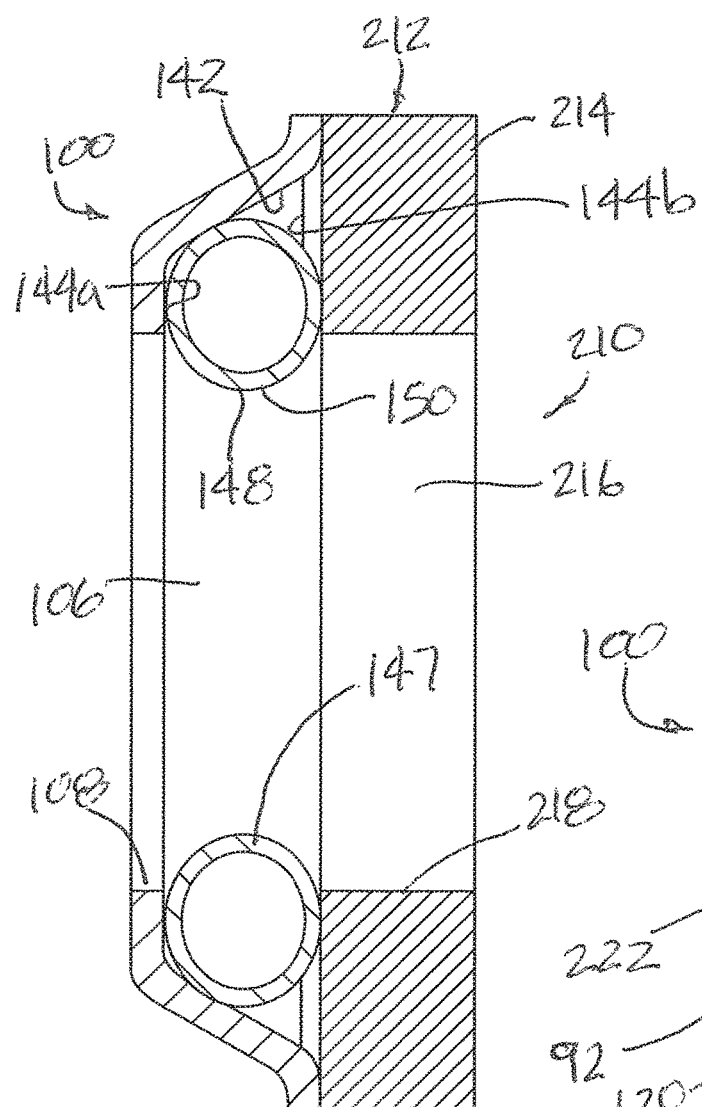
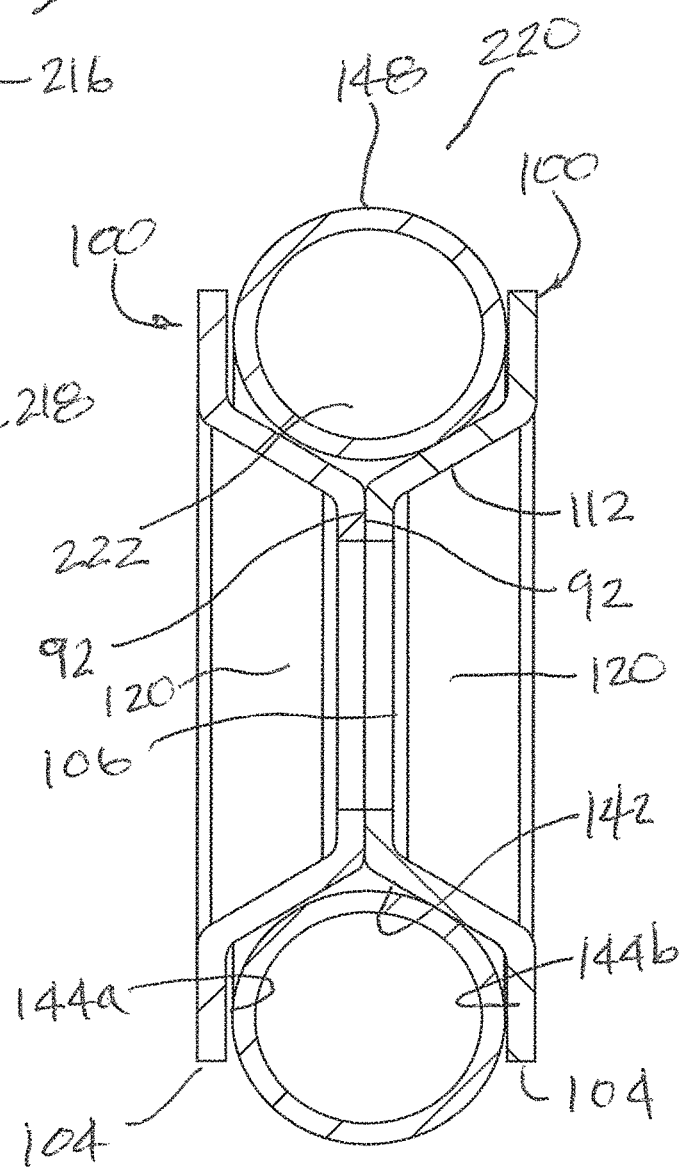
FIG. 7
FIG. 8

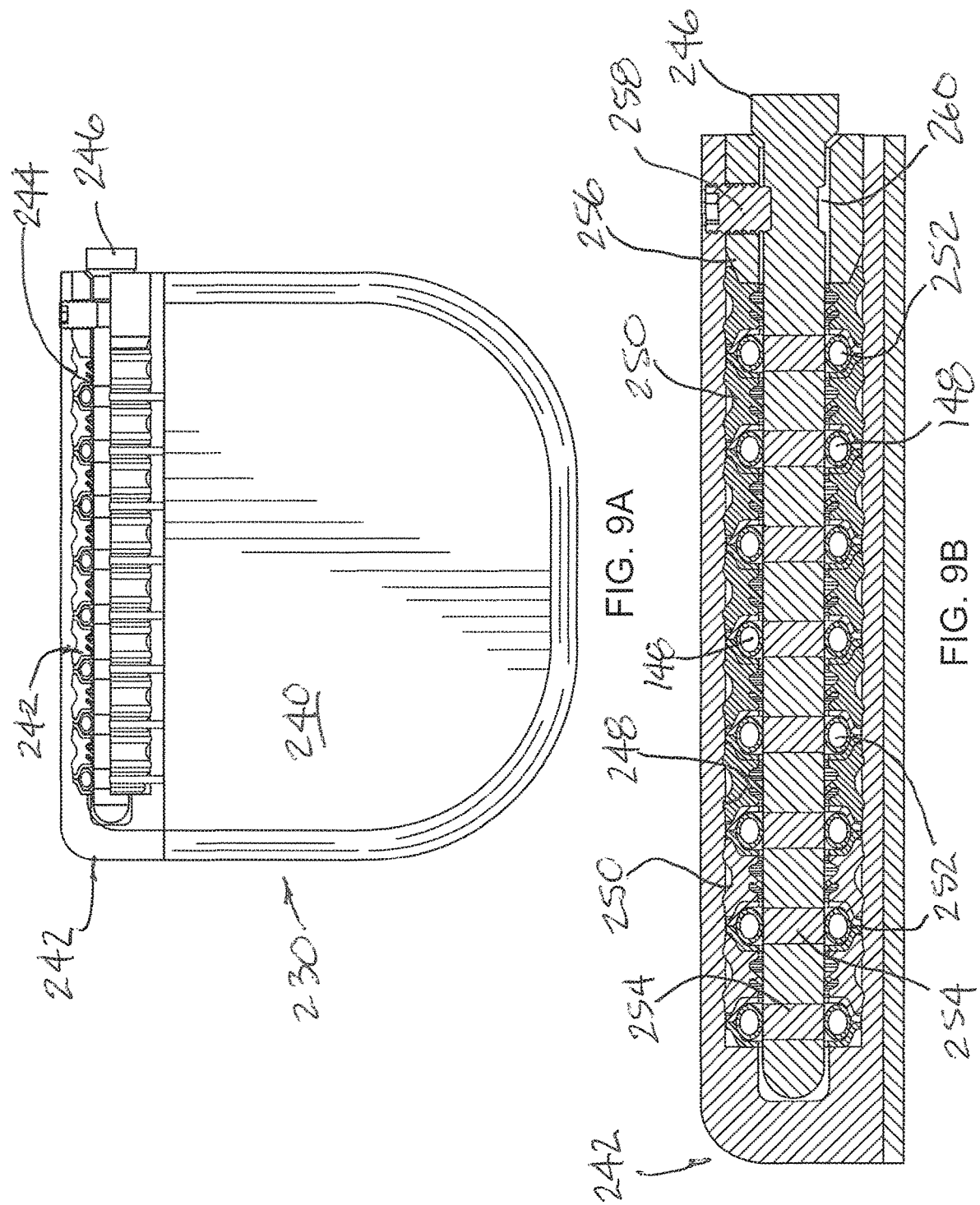

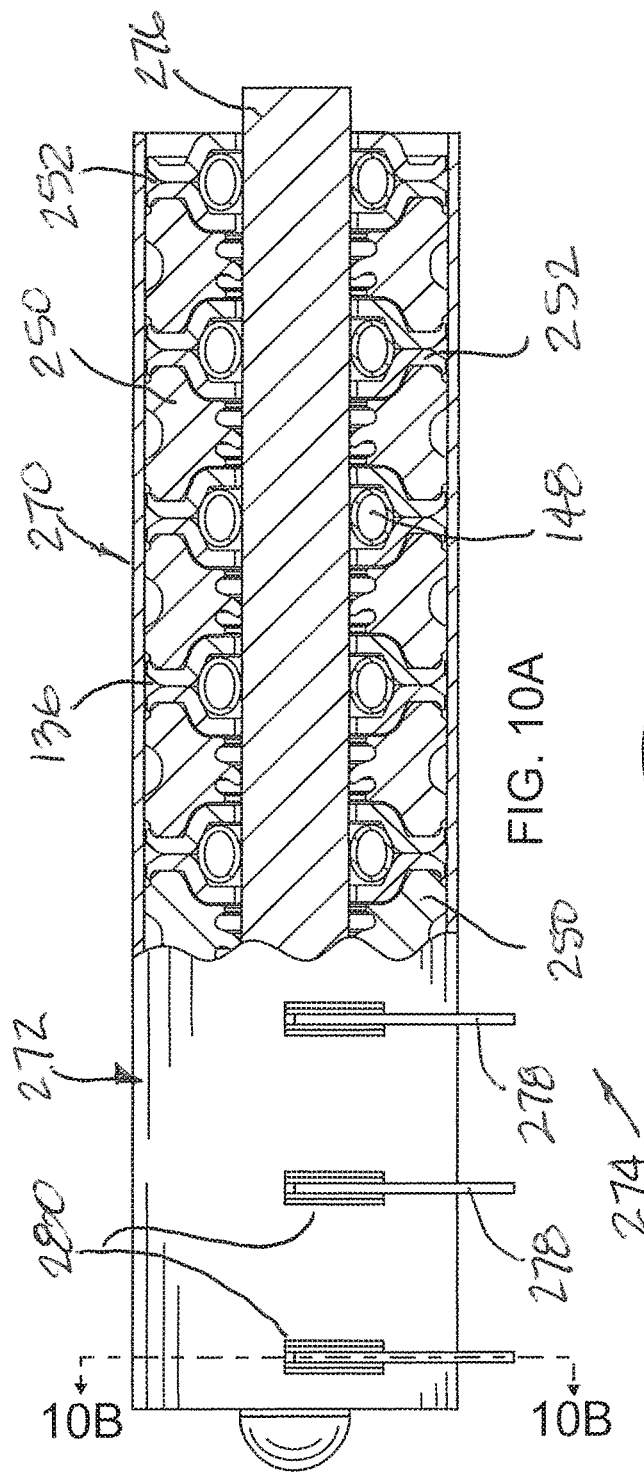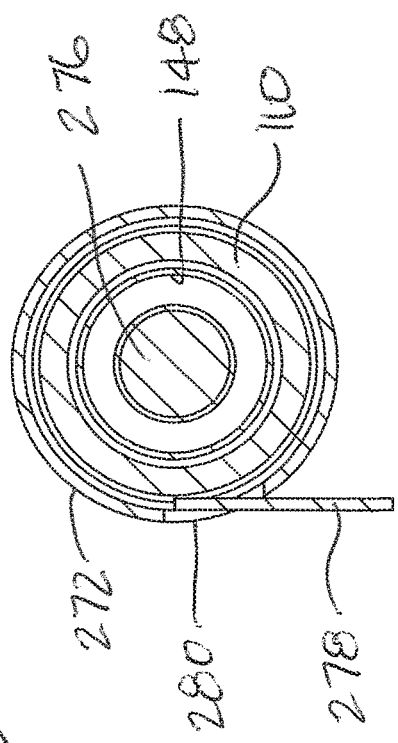

CONNECTOR HOUSINGS, USE OF, AND METHOD THEREFOR

CROSS-REFERENCE TO RELATED APPLICATION

This is a continuation application of application Ser. No. 14/990,388, filed Jan. 7, 2016, now U.S. Pat. No. 10,361,528, which is a divisional application of application Ser. No. 14/025,682, filed Sep. 12, 2013, now U.S. Pat. No. 9,284,970, which is a regular application of provisional application Ser. No. 61/701,404, filed Sep. 14, 2012, the contents of which are expressly incorporated herein by reference.

FIELD OF ART

The present disclosure generally relates to connector housings for use with a spring and more particularly to connector housings made from stamped housing sections, stamped housing sections as part of a mechanical connector, as part of an electrical connector, in a medical application, and as methods for forming and using the stamped housing sections.

BACKGROUND

Implantable stackable lead connectors to date consist of a series of machined housings, also referred to as conductive contacts, separated by sealing members and wherein a spring contact is held in a groove defined at least in part by each machined housing section. Due to tolerance concerns and critical dimension constraints, the housing components may need to be precision machined, resulting in a high cost connector. Furthermore, as the size of the connectors decrease, the housings become very difficult to machine. Exemplary implantable medical connectors are discussed in U.S. Pat. No. 8,437,855, the contents of which are expressly incorporated herein by reference for purposes of generally disclosing IMDs and in-line connectors used with IMD and components for forming or making in-line connectors.

Connectors are also known for use as mechanical fasteners, as latching connectors, as holding connectors and as locking connectors. These connectors typically have a housing with a bore and a pin either with or without a pin groove. A spring is placed in the groove, either of the housing or the pin, for forming a connection between the pin and the housing, which can be a holding connection type, a latching connection type in which the pin is allowed to be removed from the housing, or a locking connection type in which the pin is not allowed to be removed from the housing unless the connector, such as the spring, is destroyed. When the housing and the pin are coupled to an electrical source or node to pass current or electrical signals there-across, the connector can also carry current and functions as an electrical connector. Exemplary connectors are disclosed in U.S. Pat. Nos. 4,678,210; 5,082,390; 5,411,348; and 8,297,662.

SUMMARY

Aspects of the present disclosure include a stackable connector with spring contact housings formed from stamped components to achieve low manufacturing costs, reduced connector length, reduced stress and chance of misorientation of the spring contact when installed into the housing. The connector also has testing capabilities to confirm proper performance prior to completing assembly of the housing.

Due to the nature of stamped components, the housing components may be made with very consistent dimensions and thinner when compared to machined housings, which may reduce the overall length of the connector and potentially reduce the size of the implantable device.

The multi-piece housings can allow the spring contacts to be installed within the housing assemblies with reduced deflection, stress, or misorientation. Furthermore, multi-piece housings allow for proper placement and performance of spring contacts within the multi-piece housings to be tested, adjusted, and confirmed before the housing is completely assembled.

A further feature of the present disclosure is an in-line series of stackable contact assemblies and sealing members, each contact assembly comprising a housing and a spring contact, the housing being formed from at least one stamped component being joined to another component and forming a groove in which the spring contact is retained.

The connector whereby the housing can be formed from two identical stamped components. In other examples, the two stamped housing sections are not identical.

The connector whereby the components that form the housing can be joined together by welding, fasteners, or mechanically linking.

The connector whereby the housing can have an exterior groove instead of an interior groove.

The connector wherein the exterior groove can be used to retain an electrical lead.

The connector whereby the groove can be used for linear positioning of components within the connector.

The connector whereby the spring contact can be a canted coil spring, a garter spring, a cantilever spring, or a ribbon spring.

Another feature of the present disclosure is a method of testing the performance of a spring contact of a connector. The method can comprise the step of obtaining an in-line series of stackable contact assemblies and sealing members, each contact assembly comprising a housing and a spring contact, the housing being formed from at least one stamped component being joined to another component and forming a groove in which the spring contact is retained, prior to complete assembly of the housing by holding the components that form the housing together with the spring contact installed in the housing and inserting a lead to find insertion, removal, and frictional forces, and electrical performance.

Yet a still further feature of the present disclosure is a connector assembly comprising a connector housing comprising a first housing section attached to a second housing and defining an interior cavity with a housing groove comprising a groove bottom and two sidewalls. The first housing section can comprise a flange with a first side and said second housing section comprising a flange with a first side and wherein said first sides of the two flanges abut one another along a seam; and wherein each of said first housing section and said second housing section comprising an enlarged projection comprising an opening extending outwardly of the flange, said enlarged projection of each forming at least part of the groove bottom and at least part of one of the sidewalls and wherein the openings of the two enlarged projections defining a common bore.

Yet another feature of the present disclosure is a connector assembly having at least one housing section formed by stamping. The connector assembly can comprise a connector housing comprising a first housing section attached to a second housing and defining an interior cavity with a housing groove comprising a groove bottom and two sidewalls; said first housing section comprising a flange with a first side, an enlarged projection comprising an opening extending outwardly of the flange and forming at least part of the groove housing and at least part of one of the sidewalls and said second housing section comprising a flange with a first side and an opening and wherein said first sides of the two flanges abut one another along a seam. The assembly wherein the openings of the two housing sections defining a common bore and wherein at least one of the two housing sections has a curved section formed by stamping.

The connector assembly wherein both housing sections are formed from a blank in a stamping process.

The connector assembly wherein the flange of the first housing section can comprise a tab projecting into an open passage on the flange of the second housing section.

The connector assembly wherein the two flanges form an interface therebetween and wherein the interface can have a weld.

The connector assembly can further comprise a canted coil spring located in the housing groove.

The connector assembly wherein the canted coil spring has a smaller inside diameter than diameters of the two openings defining the common bore.

The connector assembly can further comprise a pin projecting through the common bore.

The connector assembly can further comprise a seal element having a bore with a seal lip, said seal element abutting the connector housing and sealingly located inside a header of an implantable medical device.

The connector can further comprise a second connector housing abutting the seal element and a second seal element abutting the second connector housing; and wherein said second connector housing has a canted coil spring located therein.

A still yet further features of the present disclosure is a connector assembly comprising a first stamped housing section having an upper flange, a skirt section, and a lower flange comprising an opening attached to a second stamped housing forming a connector housing, said second stamped housing comprising an upper flange, a skirt section, and a lower flange comprising an opening and wherein said openings defining a common bore. An interface is formed at the two upper flanges where the two housing sections attach. An interior cavity is defined by the two housing section having a housing groove comprising a groove bottom and two sidewalls with a canted coil spring disposed in the housing groove; and wherein each of said first housing section and said second housing section comprising an enlarged projection extending outwardly of the flange.

The connector assembly wherein the flange of the first housing section can comprise a tab projecting into an open passage on the flange of the second housing section.

The connector assembly wherein the interface can have a weld.

The connector assembly wherein the opening of the first housing section defines a plane and wherein the groove bottom can be tapered relative to the plane.

The connector assembly wherein the opening of the first housing section defines a plane and wherein the groove bottom can be orthogonal to the plane.

The connector assembly can further comprise a pin projecting through the common bore.

The connector assembly can further comprise a header attached to a can housing of an implantable medical device, and wherein the connector housing is disposed inside the header adjacent a seal element having a bore aligned with the common bore.

The connector assembly wherein said first housing section and said second housing section are identical.

Yet another feature of the present disclosure is a method for making a connector housing comprising stamping a first housing section, said first housing section comprising an upper flange, a skirt section, and a lower flange comprising an opening and stamping a second housing section, said second housing section comprising an upper flange, a skirt section, and a lower flange comprising an opening. The method further comprises attaching said first housing section to said second housing section by abutting said two upper flanges to form a connector housing comprising a common bore and a housing groove comprising a groove bottom and two side walls and placing a canted coil spring inside said housing groove.

The method wherein said canted coil spring can be placed in contact with said first housing section before said attaching step.

The method can further comprise the step of placing said connector housing in contact with a seal element and into a header of an implantable medical device.

The method can further comprise placing said connector housing in contact with a seal element and into an encapsulation layer to form an encapsulated stack.

DESCRIPTION OF DRAWINGS

These and other features and advantages of the present device, system, and method will become appreciated as the same becomes better understood with reference to the specification, claims and appended drawings wherein:

FIG. 2A shows an alternative housing section in a perspective view.

FIG. 2B shows the housing section of FIG. 2A in a side view.

FIG. 2C shows two housing halves of FIG. 2A connected together to form a connector housing.

FIG. 4A shows an alternative housing section in a perspective view.

FIG. 4B shows the housing section of FIG. 4A in a side view.

FIG. 4C shows two housing halves of FIG. 4A connected together to form a connector housing.

FIG. 5A shows an alternative housing section in a perspective view.

FIG. 5B shows the housing section of FIG. 5A in a side view.

FIG. 5C shows two housing halves of FIG. 5A connected together to form a connector housing.

FIG. 7 shows a cross-sectional side view of an alternative connector housing having a spring element in a spring groove.

FIG. 8 shows a cross-sectional side view of an alternative connector housing having a spring element in an exterior spring groove.

FIG. 9A shows an implantable medical device with an in-line connector stack located inside a header.

FIG. 9B is an enlarged view of the header of FIG. 9A with the in-line connector stack.

FIG. 10A is a partial elevation and cross-sectional side view of an in-line connector stack located inside an encapsulation layer.

FIG. 10B is an end view of FIG. 10A taken along line 10B-10B.

DETAILED DESCRIPTION

Figure 1D:
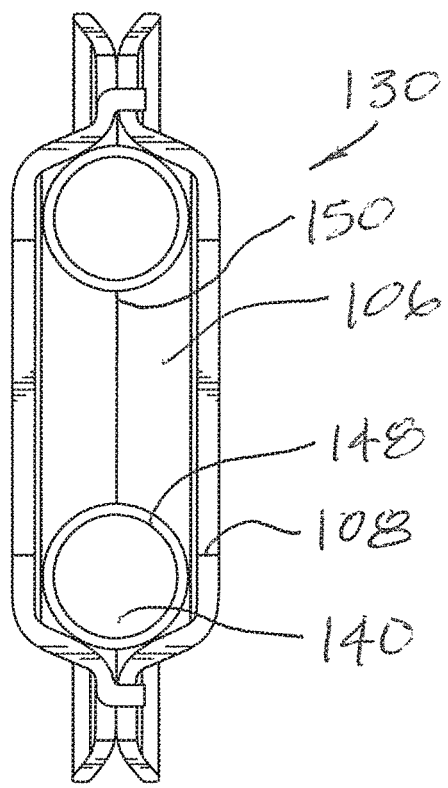
FIG. 1A shows a stamped housing half or section in a perspective view.
FIG. 1B shows the stamped housing half of FIG. 1A in a side view.
FIG. 1C shows two housing halves connected together to form a connector housing, with FIG. 1D showing the same connector housing with a spring element.
FIG. 1E shows the connector housing of FIG. 1D with a pin or shaft disposed inside the bore.

The detailed description set forth below in connection with the appended drawings is intended as a description of the presently preferred embodiments of stamped housing sections for use in various connector applications provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

With reference now to FIG. 1A, a schematic perspective view of a housing section 100 is shown, which has a housing body 102 having an outer perimeter 104 and a bore 106 with an inside diameter 108. As further discussed below with reference to FIG. 1C, the housing section 100 is configured to cooperate with another housing section 100 to form a connector housing have a groove for receiving a spring. In one example, the bore 106 is generally round for receiving a round pin or a shaft, as further discussed below. In other examples, the bore 106 can embody other shapes, such as square or oval for receiving a similarly shaped pin. The outer perimeter 104 can have the same or different shape as the shape of the bore 106. For example, the bore 106 can be round while the outer perimeter 104 is generally square. As shown, the outer perimeter 104 and the bore 106 both have a round shape.

The housing section 100 may be made using a coining process, which is a cold working process similar to forging, except the latter usually takes place at elevated temperatures. A die or multiple dies may be used in a coining process to first cut a blank and then shaping the blank into a refined shape, which can optionally further be machined or laser treated to further modify the final shapes and tolerances. The die or dies used to shape the blank may have different shapes and contours for forming a different shaped housing section. Generally speaking, the shaped housing section can be described as a negative image of the die or dies. A great deal of force is used to plastically deform a blank or work piece. In one example, a hydraulic actuated press is used to supply the working pressure. In other examples, a gear driven press or a mechanical press may be used to supply the working pressure. Coining is similar to stamping with the difference primarily being the working force or pressure. Unless the context indicates otherwise, coining and stamping for purposes of the present disclosure are used synonymously.

Blank materials usable as the starting point for forming the disclosed housing section 100 may be made from any number of conductive metals. Examples of metals that are capable of conducting current include steel, stainless steel, copper, and gold. Additionally, stainless steel type 316L, MP35N® alloy, which is a stainless steel and nickel-based alloy, platinum-iridium, titanium and others may be used. Alternatively, the material can be conventional medically implantable grade material with noble metal coatings, such as platinum over stainless steel. By coating a non-noble metal element with a noble metal, the more desirable conductive and corrosion resistant properties of the noble metal are married with the significantly lower cost of non-noble metals such as high-strength nickel alloys and stainless steel. Thus, the stamped housing section 100 may be understood to be made from a single metal material or a multi-layer metal material with the latter having a base metal layer and one or more cladding or plating over-layers. For certain connector applications, plastic injection molding may also be employed to form the stamped housing and then providing a path through the plastic housing to terminate an electrical lead to the canted coil spring. For pure mechanical applications without current or signal carrying capability, two injection molded housing sections 100 may be joined with a canted coil spring located in between to form a connector housing.

As shown, the housing section 100 comprises an upper flange 110, a skirt section 112, and a lower flange 114. The upper flange 110 may be generally planar, as shown in FIG. 7, or may have a curved surface, as shown in FIG. 1B. In one example, the upper flange 110 has a generally flat or planar section 110a with a tapered outwardly section 110b towards the perimeter 104 and a tapered inwardly section 110c, towards the bore 106. As shown with reference to FIG. 1C, the tapered inwardly section 110c flows into or is joined with the skirt section 112. Relative to a planar surface 116 defined by the bore 106, the skirt section 112 is tapered. The taper may have a single slope or a curve. In another example, the skirt section 112 is generally orthogonal to the planar surface 116 defined by the bore 106. The skirt section 112 extends from the tapered inwardly section 110c in a sloped or slanted manner. In another example, the skirt section 112 forms a right angle with the tapered inwardly section 110c. The inside or inner most part of the upper flange 110 defines an inner perimeter 118 for the recessed space 120 of the housing section 100, which is bounded in part by the skirt section 112 and the lower flange 114. The recessed space 120 is configured to accommodate a spring, as further discussed below. The housing section has a first side or operative side 90, such as for accommodating a spring, and a second side or non-operative side 92. However, in some applications, the second side 92 can also be an operative side for forming an external groove, such as that shown in FIG. 8. With reference to FIG. 1C, the first side or operative side 90 of two housing sections 100 are configured to contact to form a connector housing 130 having an interior cavity 132. The connector housing 130, which can be conductive when selecting appropriate conductive metallic material or a combination of materials, may be referred to an a conductive contact element, such as when used in combination with an in-line header connector as further discussed below with reference to FIGS. 9A-11B. The second or non-operative 92 side face away from the interior cavity 132 but can contact another housing section 100 when stacking a plurality of housing sections 100 (not shown) in a stack with all housing sections facing the same direction, such as for packaging or shipping.

In one example, the blank for forming the housing section 100, and therefore the housing section, has a generally constant thickness, which can be sized or selected depending on the material hardness and the type of connector application to be used, such as for a heavy duty high insertion and/or removal force applications, for a mechanical connector, for an electrical connector, etc. In other examples, the thickness can vary to allow for bending and shaping the contour of the housing section 100. By forming the housing section using a stamping process rather than machining the housing from a metal block, consistent housing dimensions and thinner sections can be obtained, which can reduce the overall length or size of a completed product, such as a the overall size of an in-line connector stack, and reduce manufacturing costs.

As shown, the upper flange 110 has two tabs 120 having ends 120a projecting away from the bore 106 and two open passages 122. The tabs 120 may be formed by creating or making a three-sided cut on the flange 110 and then bending the material away from the bore 106. The two open passages 122 may be formed by completely punching through the surface layer of the flange. The opening of the two open passages 122 should be sized and shaped to receive the corresponding tabs 120, as shown with reference to FIG. 1C and further discussed below. In one example, the two tabs 120, when bent, have wall surfaces that are generally parallel to one another. In another example, the tabs slightly converge towards one another or slightly away from one another so that when they project in the corresponding open passages 122, the surfaces form interference or snap fit arrangement. The locations of the open passages 122 and the tabs 120 should be equally spaced along the flange 110. In some examples, three or more tabs with corresponding three or more open passages are provided on the flange at equally spaced intervals. The stamped housing section 100 is suited for mass production and a connector housing is readily formed by combining two of such housing sections 100, as discussed below with reference to FIG. 1C.

FIG. 1B is a schematic side view of the housing section 100 of FIG. 1A. As shown, the skirt section 112 projects away from the upper flange 110. The projection may be referred to as an enlarged body portion 134 extending outwardly from the flange 110. The enlarge body portion 134 has an outer dimension that is smaller than the outer perimeter 104. The housing 100 is understood to have at least two tabs 120 extending away from the upper flange 110. Still further, the housing 100 is understood to have a flange defining a plane, at least two tabs extending away from the plane and an enlarged body portion extending away from the plane. In a specific example, the tabs and the enlarged body portion extend away from one another.

With reference again to FIG. 1C, a connector housing 130 is formed by attaching two housing sections 100 of FIG. 1A so that their operative sides 90 contact. The two housing sections 100 may be joined by first placing them in opposing contact and rotating one the housing sections 100 so that the two tabs 120 of one housing section 100 align with the two open passages 122 of the other housing section 100 and then pressing the two housing sections 100 together so that their respective upper flanges 110 abut, which causes the tabs 120 to project through corresponding open passages 122 in a slight interference fit. In other examples, the tabs 120 are slightly bent or deformed after projecting through the corresponding open passages 122 so as to form an interference or press-fit. In still other examples, the two housing sections 100 are secured to one another by welding them along the interface 136, such as with spot welds or laser welds. Foreseeably, the housing sections may be practiced without any tabs 120 and the two housing sections are simply welded together, such as with spot welds or continuous welds, to form a connector housing. An outer encapsulation sleeve or layer may also be used to capture and hold the two housing sections together instead of or in addition to mechanical engagement and/or welding.

As shown, the connector housing 130 is created by two separately formed housing sections 100 that are subsequently attached together. In the example shown, the two connector housing sections 100 are the same. The connector housing 130 has four mechanical connection points or joints 138 (only two shown) formed by two tabs 120 of each housing section 100 projecting into two corresponding open passages 122 of the opposing housing section. In other examples, such as where three tabs and three open passages are incorporated in each housing section, there can be more than four mechanical connection points 138. There can also be fewer than four mechanical connection points or zero mechanical connection point. For example, only one tab and one opening on each housing section to form two mechanical connection points can be provided for alignment purposes and to temporarily hold the two sections together with final housing connector more permanently secured by welding the interface 136 using spot welds or laser welds. Optionally, only a single mechanical connection point 138 is used to temporarily hold the two housing sections together before welding to more permanently secure the two.

As shown, a housing groove 140 is formed by the two joined housing sections 100. Said differently, a groove 140 is formed by joining two stamped housing sections 100 together. In the present embodiment, the groove 140 is formed by joining two identical housing sections together. In other examples, such as to from a non-symmetrical groove, two different shaped housing sections are joined together to form a housing groove. The groove 140 is generally V-shaped, such as a V-groove. In other examples, by modifying the contour of the skirt section 112, the shape of the groove 140 may be altered. For example, the skirt section 112 may be orthogonal to produce a flat bottom groove 140. In still yet other examples, two housing sections 100 for forming the connector housing 130 may not be identical and may have two different shaped or contoured skirt sections 112 to form a non-symmetrical housing groove relative to the interface line 136. Thus, the connector housing 130 may be viewed as having a common bore 106, an interior cavity 132, and a housing groove 140 formed without any machining to form the groove. Optionally, the surface of the skirt section 112 forming the groove may be machined to further fine tune the groove 140 geometry. As shown, the groove has a bottom wall 142 and two sidewalls 144a, 144b. In the embodiment shown, the bottom wall 142 has a parting line generally at the middle of the groove. In yet other examples, if the housing sections 100 are not symmetrical, the parting line of the groove may be offset from center. As shown and excluding the tabs 120, the two housing sections are symmetrical about the interface 136. In other words, the two housing sections 100 may be understood to be formed from stamping and be symmetrical about the interface 136. Said differently, a connector housing 130 can be provided by joining two symmetrical stamped housing sections about an interface to form a housing groove 140. As previously alluded to, the term stamped housing section does not preclude some machining, such as to fine tune certain geometries of the housing sections to fine tune the completed connector housing.

Exteriorly, a second groove 146 is provided at the interface 136. The second groove 146 is formed by the tapered outwardly sections 110b of the two upper flanges 110 of two adjacent housing sections 100. The outer groove 146 may optionally be omitted by making the upper flanges 110 generally planar or be modified, such as changing the contour thereof, by changing the shaped of the tapered outwardly sections 110b or making one of the two sections flat. As shown, the outer groove is generally V-shaped and may be used to attach a lead or a cable thereto, such as for an electrical connector application.

With reference now to FIG. 1D, a canted coil spring 148 is shown located in the groove 146 of the connector housing 130, i.e., the spring is housing mounted. The spring 148 may be an axial canted coil spring or a radial canted coil spring and each comprising a plurality of coils canted in the same direction with each coil comprising a major axis and a minor axis. In other examples, the spring can be a garter spring, a cantilever spring, or a ribbon spring. Exemplary canted coil springs are disclosed in U.S. Pat. Nos. 4,655,462; 4,826,144; and 4,876,781, the contents of which are expressly incorporated herein by reference. The spring 148 is made from a conductive metal and may be plated or cladded with one or more outer layers over a base metallic layer. As used herein, conductive metal means any metal capable of conducting current, such as steel, stainless steel, copper, and gold. In certain embodiments, a preferred conductive metal, such as copper, copper alloy, or a preferred combination, such as copper with silver or other noble metal cladding, may be used. For high temperature applications, a soft base metal may be used with a high tensile strength outer layer, such as a copper core with a stainless steel outer layer. In another example, the combination may be practiced in the reverse, i.e., with the high tensile strength material as the base core material and the high conductive property material, such as copper, as the cladding outer layer. In still yet other examples, the high tensile strength property material can include heat treated carbon steel, INCONEL® alloys, and HASTELLOY® alloys. INCONEL alloys are understood to include a family of nickel-chromium-based super alloys. HASTELLOY are understood to include a family of nickel based super alloys that include varying percentages of elements such as molybdenum, chromium, cobalt, iron, manganese, etc. In an example, the second conductive clad layer having high conductivity can include copper, copper alloy, aluminum, aluminum alloy, gold, gold alloy, silver, silver alloy, brass, or brass alloy. The combination with a high tensile strength base material and a conductive cladding material is configured to offer high conductivity as well as retain high tensile and high modulus properties at elevated temperatures. The high conductivity layer is preferably positioned on the side of the spring that contacts or faces a pin (not shown). However, in another embodiment, the high tensile strength material can contact or face the pin.

Figure 1E:
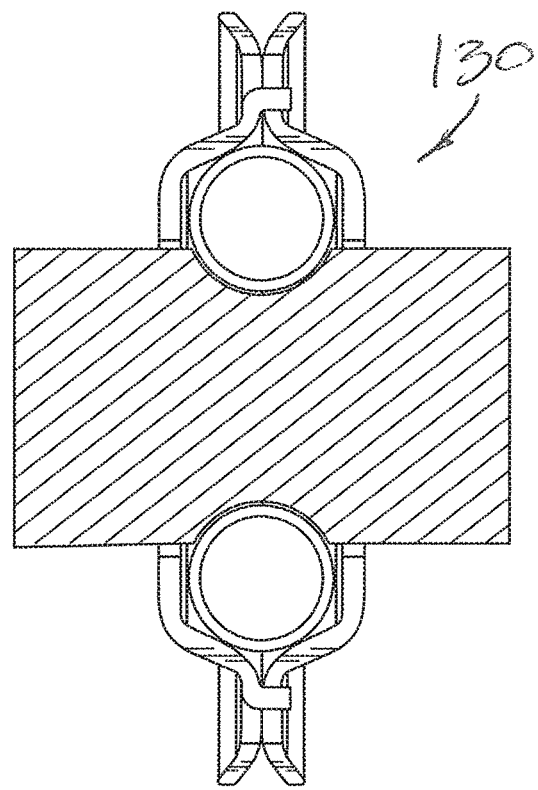

As shown in FIG. 1D and further with reference to FIG. 1E, the inner diameter 150 of the spring 148 is smaller than the diameter 152 of the bore 106 and smaller than the nominal diameter 42 of the pin 40. Thus, when the pin 40 is inserted in through the bore 106, the pin makes contact with the spring 148 and the spring is biased against the housing groove 140 and the pin 40 to form a mechanical connector and optionally with current or electric carrying capability, if connected to electrical sources. The pin 40 is shown with an exterior groove 44, such as for a latching or a locking application, or can be without a groove, such as for a holding application. The housing groove 140 may have a width that is narrower than the coil major axis so that the coils are rotated, such as being constrained by the groove sidewalls, when positioned in the housing groove. The housing groove width may also be wider than the coil major axis and/or the coil minor axis so that the coils do not touch the groove sidewalls when placed therein. Still alternatively, the groove depth may be such that the spring does not touch the groove bottom surface 142 when the pin 40 is not inserted and wherein when the pin is inserted, the pin pushes on the spring to then contact the groove bottom. This feature allows for low insertion force.

The connector housing 130 and pin 40 combination, using the present disclosed stamped housing sections 100, is capable of being used in numerous applications and industries as mechanical connectors and optionally with electrical carrying capabilities, i.e., as electrical connectors. For example, the connector housing 130 with at least one stamped housing section and pin combination may be used in aerospace, automotive, consumer electronics, and oil and gas applications to secure a first object to a second object or to conduct electricity, such as current or signals, between two different sources or nodes.

During assembly, the spring 148 may be placed in the recessed space 120 of the first housing section 100 and then the second housing section 100 is attached to the first housing section. This allows the spring 148 to be installed within the housing 130 with minimal deflection and stress to the spring, which in turn reduces the possibility of misorientation of the spring contact within the housing groove 140. In contrast to a typical prior art one-piece machined housing, the installation of a spring into the spring groove would require deflecting the spring a significant amount to fit the spring through the housing bore diameter and then once through the bore diameter allow the spring to expand. However, this process can lead to the spring being tilted or misoriented within the groove upon expanding, thus possibly resulting in a high force insertion or removal of the pin in through the bore of the one-piece housing, such as by having the pin contacting the spring closer to the major axis of the spring coils.

With reference again to FIG. 1E, the pin 40 is shown with a tapered insertion end 46 and with a V-groove 44, which comprises two tapered wall surfaces 48a, 48b that converge towards the pin centerline. The pin 40 can vary in length. In the particular embodiment shown, the V-groove 44 has a flat bottom wall 50. In other examples, the two tapered wall surfaces 48a, 48b converge to a point (i.e., no bottom wall). In still other examples, the two sidewalls 48a, 48b can be generally parallel and the bottom wall is flat relative to the generally parallel sidewalls or has a single taper relative to the two sidewalls. In yet other examples, one sidewall can be vertical while the other is slanted or tapered. The connector assembly 60 is understood to be connectable to other components. For example, the pin may be connected to a first object and the connector housing to a second object for securing the first object to the second object via the connector assembly.

With reference now to FIG. 2A, a perspective view of an alternative housing section 100 provided in accordance with aspects of the present device, system, and method is shown. The alternative housing section 100 is similar to the housing section 100 of FIGS. 1A-1C except for the following features. In the present alternative embodiment, two tabs 160 are shown with each tab 160 formed by providing two opposing cuts on the upper flange 110 and then cold extruding the surface layer 111 between the two opposing cuts to form a projection-type tab 160. From a side view of each tab 160, the tab has a generally V-shape with the ends of the V remaining in contact with the flange surface 111.

FIG. 2B is a side view of the housing section 100 of FIG. 2A.

FIG. 2C shows a connector housing 130 formed by attaching two housing sections 100 of FIG. 2A so that their operative sides 90 contact. As is readily apparent, the two housing sections 100 may be joined by first placing them in opposing contact and turning or rotating one of the housing sections 100 to align the two tabs 160 of one housing section with the two open passages 122 of the other housing section 100 and then pressing the two housing sections together so that their respective upper flanges 110 abut. The tabs 160 may form a slight interference fit with their corresponding open passages 122. In other examples, the two housing sections 100 are secured to one another by welding them along the interface 136, such as with spot welds or laser welds, in addition to the mechanical connection points 138. The connector housing 130 of FIG. 2C is understood to include or have a canted coil spring positioned in the interior cavity 132 thereof before the two housing sections 100 are combined or joined together. Optionally the spring may be placed into the spring groove after the connector housing 130 is formed but it is not preferred.

Figure 3A:
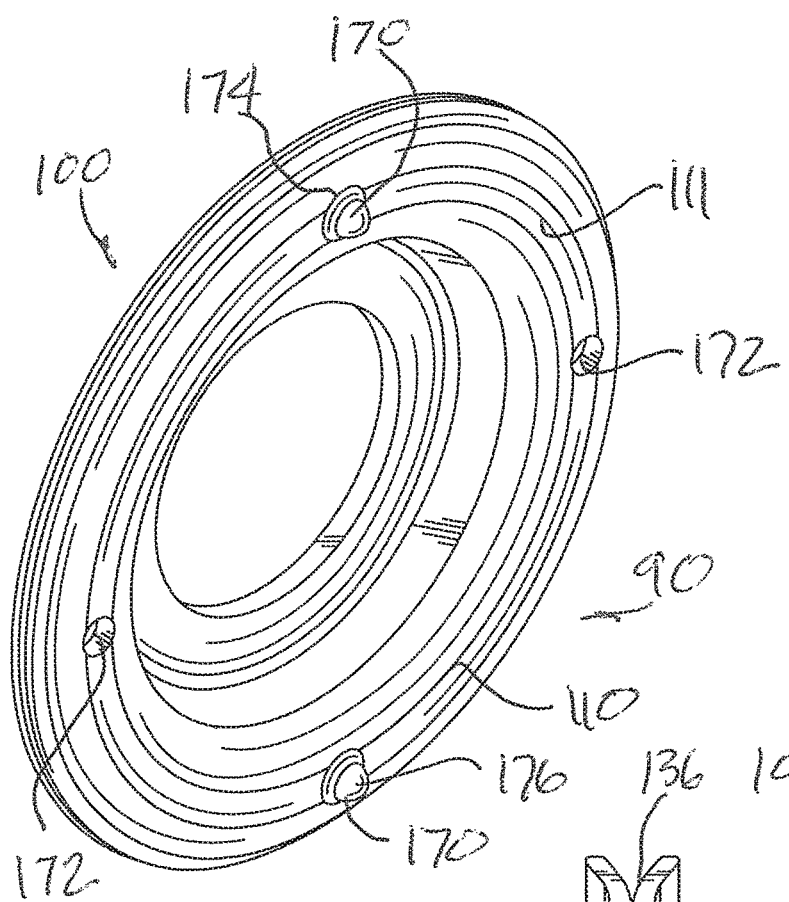
FIG. 3A shows an alternative housing section in a perspective view.

With reference now to FIG. 3A, a perspective view of an alternative housing section 100 provided in accordance with aspects of the present device, system, and method is shown. The alternative housing section 100 is similar to the housing section 100 of FIGS. 1A-1C except for the following features. In the present alternative embodiment, two tabs 170 are shown with each tab 170 formed by cold extruding the surface layer 111 of the upper flange 110 with a blunt object, such as a blunt rod or pin, to form dome-shaped tabs. The tabs 170 each comprises a round base 174 and a generally spherical top 176. The alternative housing section 120 is also shown with two different open passages 172 for receiving the two tabs 170. As shown, the open passages 172 are generally round and sized to receive the corresponding tabs 170 in an interference fit. Optionally, the engagement is loose and the two housing sections are welded together to more permanently secure them together.

Figure 3B:
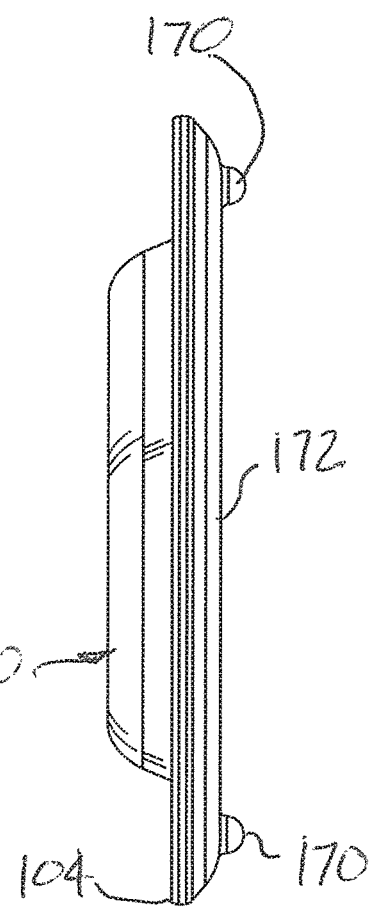
FIG. 3B shows the housing section of FIG. 3A in a side view.

FIG. 3B is a side view of the housing section 100 of FIG. 3A.

Figure 3C:
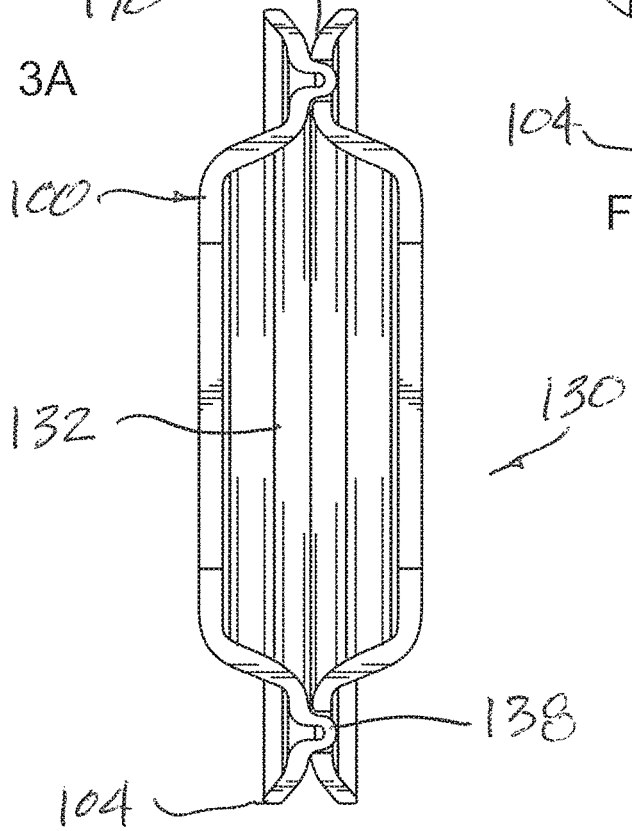
FIG. 3C shows two housing halves of FIG. 3A connected together to form a connector housing.

FIG. 3C shows a connector housing 130 formed by attaching two housing sections 100 of FIG. 3A so that their operative sides 90 contact. The two housing sections 100 may be joined by first placing them in opposing contact and turning or rotating one the housing sections 100 so that the two tabs 170 of one housing section 100 align with the two open passages 172 of the other housing section 100 and then pressing the two housing sections together so that their respective upper flanges 110 abut. The tabs 170 may form an interference fit with their corresponding open passages 172. In other examples, the two housing sections 100 are secured to one another by welding them along the interface 136, such as with spot welds or laser welds, in addition to the mechanical connection points or joints 138. The connector housing 130 of FIG. 3C is understood to include or have a canted coil spring positioned in the interior cavity 132 thereof before the two housing sections 100 are combined or joined together.

With reference now to FIG. 4A, a perspective view of an alternative housing section 100 provided in accordance with aspects of the present device, system, and method is shown. The alternative housing section 100 is similar to the housing section 100 of FIGS. 1A-1C except for the following features. In the present alternative embodiment, two tabs 180 are shown with each tab 180 formed by providing three cuts on the upper flange 110 and then cold extruding the surface layer 111, such as bending, the surface layer to form tabs. However, unlike the tabs 120 of FIG. 1A, the tabs 180 of the present embodiment are oriented differently. For example, while the tabs 120 of FIG. 1A are connected at the inside of the three-cuts for forming the tab, inside being radial inward towards the bore 106, the tabs 180 of the present embodiment are arranged differently. Only one tab 180 is similar to that of FIG. 1A while the other tab 180 is connected to the wall surface layer 111 along an outer section, outer being radially outward closer to the perimeter 104. The two tabs 180 can be said to be offset of one another. The open passages have also been eliminated. Instead, the present housing section 100 utilizes a combination tab/opening at each tab location to engage.

FIG. 4B is a side view of the housing section 100 of FIG. 4A.

FIG. 4C shows a connector housing 130 formed by attaching two housing sections 100 of FIG. 4A so that their operative sides 90 contact. As is readily apparent, the two housing sections 100 may be joined by first placing them in opposing contact and turning or rotating one the housing sections 100 so that the two tabs 180 of one housing section 100 align with the two tabs 180 of the other housing section 100 and then pressing the two housing sections together so that their respective upper flanges 110 abut. The tabs 180 of one housing section 100, because of the offset arrangement, align with two tabs 180 of the other housing section 100. The engagements have a slight interference fit with their corresponding tabs, such as by bending the tabs to rub against the openings. In other examples, the two housing sections 100 are secured to one another by welding them along the interface 136, such as with spot welds or laser welds, in addition to the mechanical connection points 138, with each comprising two tabs 180. The connector housing 130 of FIG. 4C is understood to include or have a canted coil spring positioned in the interior cavity 132 thereof before the two housing sections 100 are combined or joined together.

With reference now to FIG. 5A, a perspective view of an alternative housing section 100 provided in accordance with aspects of the present device, system, and method is shown. The alternative housing section 100 is similar to the housing section 100 of FIGS. 1A-1C except for the following features. In the present alternative embodiment, two 190 tabs are formed at the perimeter 104 with both tabs cold extruded to bend and point to the first side 90 while two additional tabs 192 are formed at the perimeter 104 with both tabs cold extruded to bend and point to the second side 92 of the housing section 100. The four tabs 190, 192 are formed by making four cuts 194 at the perimeter 104 and bending alternate sections of the surface layer 111 to point either to the first side 90 or to the second side 92. Thus, the present housing section 100 is understood to have two pairs of tabs 190, 192 formed at the perimeter 104 of the housing section. For example, the tabs 190, 192 are formed by cutting the upper flange 110 so that the perimeter 104 of the upper flange comprises a plurality of cuts 194. As shown, the cuts are radially oriented. In other examples, the cuts can be slanted. In still yet other examples, there can be more than four cuts, such as six cuts, to form six tabs, such as to form two sets of three tabs with the tabs pointing to the first side 90 or to the second side 92.

FIG. 5B is a side view of the housing section 100 of FIG. 5A.

FIG. 5C shows a connector housing 130 formed by attaching two housing sections 100 of FIG. 5A so that their operative sides 90 contact. The two housing sections 100 may be joined by first placing them in opposing contact and turning or rotating one of the housing sections 100 so that the first set of two tabs 190 of one housing section 100 align with the second set of two tabs 192 of the other housing section 100 and the second set of two tabs 192 of one housing section 100 align with the first set of two tabs 190 of the other housing section 100. The two housing sections 100 are then pushed together so that their respective upper flanges 110 abut. The tabs 190, 192 of one housing section 100, because of the offset arrangement, align with the tabs 190, 192 of the other housing section 100. The connection may be a simple contact to limit relative rotation between the two housing sections. In other examples, the two housing sections 100 are secured to one another by welding them along the interface 136, such as with spot welds or laser welds. The connector housing 130 of FIG. 5C is understood to include or have a canted coil spring positioned in the interior cavity 132 thereof before the two housing sections 100 are combined or joined together. In still other examples, as discussed above, an encapsulation layer may be used to hold the two housing sections 100 together with a spring therebetween.

Figure 6A:
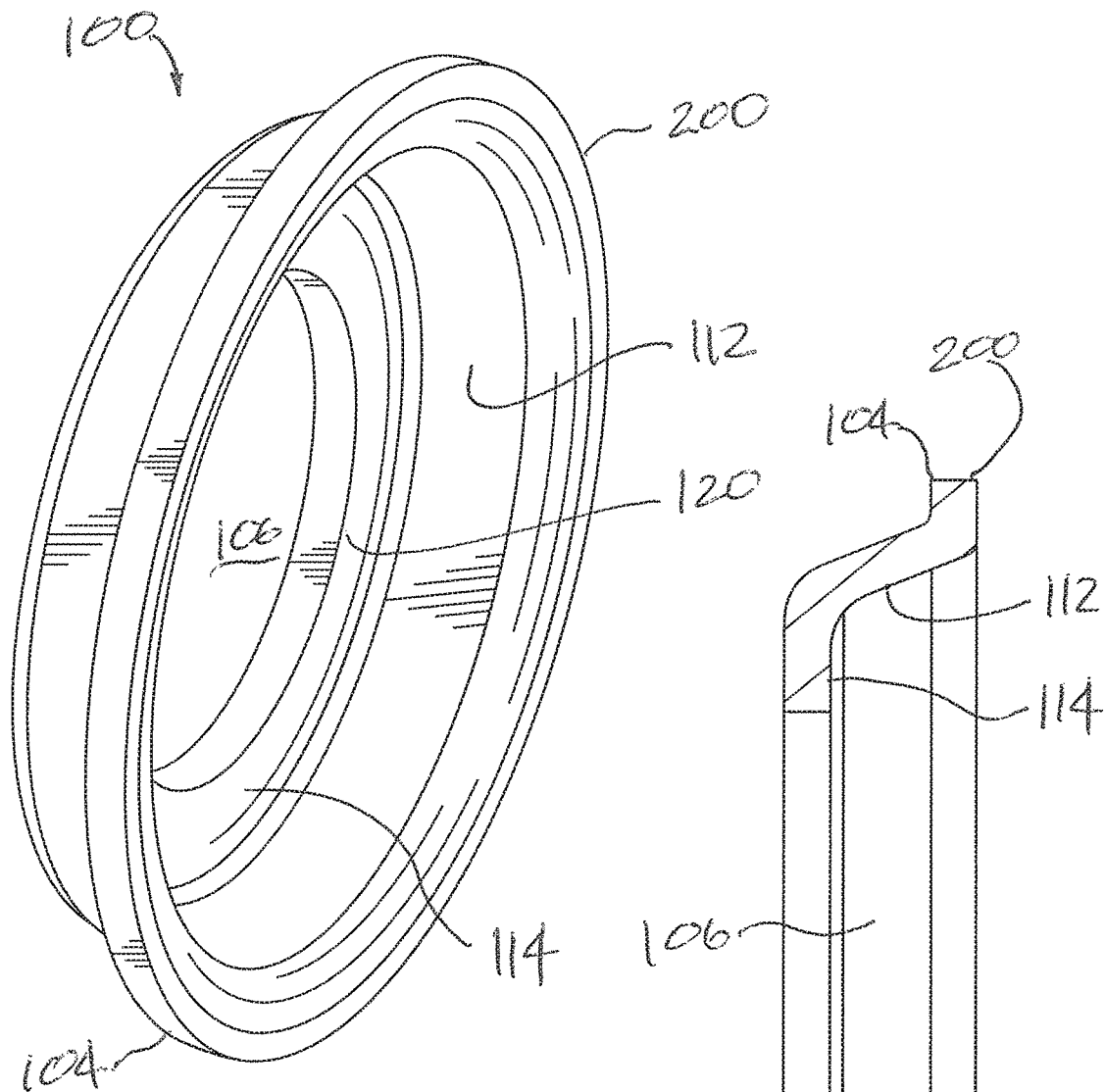
FIG. 6A shows an alternative housing section in a perspective view.
Figure 6B:
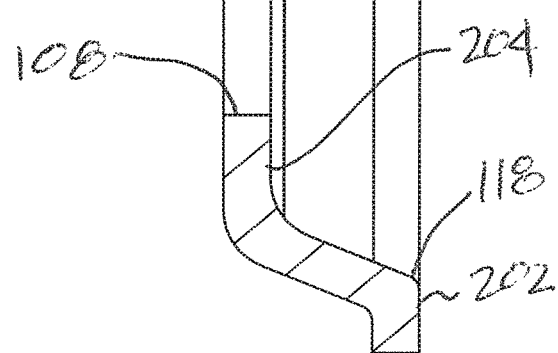
FIG. 6B shows the housing section of FIG. 6A in a cross-sectional side view.

With reference now to FIG. 6A, a perspective view of an alternative housing section 100 provided in accordance with aspects of the present device, system, and method is shown. The alternative housing section 100 is similar to the housing section 100 of FIGS. 1A-1C except for the following features. In the present alternative embodiment, no engagement tabs and no open passages are incorporated on the upper flange 200. Instead, as further discussed below, the upper flange 200 is configured to mate or abut against a flat surface, with no mechanical engagement. The upper flange 200 is relatively narrower than the upper flange 110 of FIG. 1A and noticeably flatter in profile, as shown in FIG. 6B. Thus, the outer perimeter 104 of the upper flange 200 is situated closer to the inside perimeter 118 of the recessed space 120. As with the other connector housing sections 100, the gap between the surface 202 of the upper flange 200 and the surface 204 of the lower flange 114 may be adjusted depending to the type and/or size of the spring to be accommodated. Similarly, the skirt section 112, while shown with a taper, may be adjusted to have a generally flat surface, i.e., generally orthogonal to the surface 202 of the upper flange 200. Furthermore, while the two surfaces 202, 204 of the two flanges are generally parallel, the surface 204 of the lower flange 204 may be slightly tapered to produce a housing groove with a tapered sidewall.

FIG. 7 is a cross-sectional side view of a connector housing 210 provided in accordance with aspects of the present device, system, and method. As shown, the connector housing 210 comprises a housing section 100, such as the one shown in FIG. 6A, abutted against a housing backing flange 212 comprising a body 214 comprising an opening 215 and a bore 216 having an inside diameter 218. In one example, the housing backing flange 212 is made from a conductive material and is attached to the housing section 100 by welding. In another example, the housing backing flange 212 is made from an engineered plastic and is attached to the housing section 100 by high temperature resistant bonding. In another example, the backing flange 212 has open passages for receiving tabs extending from the housing section 100, similar to the tabs shown in FIGS. 1A-4C. The backing flange 212 may be machined or cast or may be stamped from a blank to form the bore 216. Thus, the connector housing 210 has at least one stamped housing section 100 and is non-symmetrical. If the housing backing flange 212 is also stamped, then the entire connector housing 210 may have two stamped housing sections but is non-symmetrical about an interface between the two housing sections 100, 212.

As shown, the housing connector 210 comprises a housing groove 140 with a tapered bottom wall 142 and two generally parallel sidewalls 144a, 144b, including a first side 90 and a second side 92. The first side 90 of the housing flange 212 contacts the first side 90 of the stamped housing section 100. The groove is sized and shaped to accommodate a canted coil spring 148, which is shown as an axial canted coil spring with a radial canted coil spring contemplated. While only two coils are shown, the canted coil spring 148 is understood to include a plurality of coils all canted in the same direction and all comprising a major axis and a minor axis. Furthermore, it is understood that the spring will only deflect in the canting direction along the minor axis but not the major axis. The spring 148 has an inside diameter 150 that is smaller than the ID 108 of the housing section and the ID 218 of the bore of the housing backing flange 212. The connector housing 210 and spring 148 are configured to receive a pin (not shown) having a pin OD that is larger than the spring ID so that the spring is biased by the pin and the housing 210. As discussed elsewhere herein, the pin may have an external groove to latch or lock the pin relative to the housing, such as by capturing the spring in between the housing groove and the pin groove, or without an external groove to hold the pin to the housing, such as by using spring bias force or push against the flat exterior surface of the pin to hold the pin using friction and biasing forces. The pin (not shown) preferably includes a tapered pin insertion end to facilitate inserting the pin into the bore of the connector housing and through the inside diameter of the spring. Exemplary use of holding, latching, and locking connectors but without the unique housing connectors and grooves utilizing stamped connector parts are disclosed in U.S. Pat. Nos. 4,678,210; 5,082,390; 5,411,348; and 8,297,662, the contents of which are expressly incorporated herein by reference. Any of the various pins disclosed in these patents may be used with the connector housings of the present disclosure.

With reference now to FIG. 8, a schematic cross-sectional side view of yet another connector housing 220 provided in accordance with aspects of the present device, system, and method is shown. The connector housing 220 is shown with an external groove 222 formed by placing two stamped housing sections 100 back-to-back. More specifically, the housing connector 220 is formed by placing the second side 92 of two housing sections 100 together to form the exterior groove 222 comprising a groove bottom 142 and two sidewalls 144a, 144b. In practice, the spring 148 is placed over the outside skirt section 112 of one stamped housing section 100 before placing the second housing section 100 in abutting contact with the first. This will allow the spring 148 to be positioned on the connector housing 220 without having to expand the spring inside diameter to mount the spring over the perimeter 104 of the groove 222. The two housing sections 100 may be secured together to form the connector housing 220 using any known means, including welding, bonding, detents, tabs, set screws, etc.

The connector housing 220 is configured for use with or inside a bore (not shown), such as for inserting the connector housing 220, including the spring 148, inside the bore of a housing. The common bore 106 of the two housing sections 100 are configured to receive a pin, which is to be fitted with one or two adaptors (not shown) having an outside contour for mating or matching with the recessed space 120. In another example, two separate shaft sections (not shown) each with an end sized and shaped to couple with the recessed space 120 of each housing section 100. In other words, the connector housing 220 may be viewed as forming part of an exterior groove of a pin, such as by forming two separate pin sections to attach to the connector housing 220. The perimeter 104 of the two housing sections 100 therefore represents the nominal outside diameter of the pin having the connector housing 220 of FIG. 8 as the exterior pin groove. Again, by modifying the skirt section of one or both housing sections 100, the pin groove geometry may be altered, such as to have a flat bottom wall, a single slope bottom wall, tapered sidewalls, generally parallel sidewalls, a narrow width to touch the spring, a wide width to not touch the spring with the sidewalls, a deep groove to not touch the spring with the bottom wall, etc.

With reference now to FIG. 9A, an implantable medical device 230 comprising a can housing 240, a header 242, and an in-line connector stack 242 comprising a plurality of connector components having a common bore for receiving a lead cable 244 is shown. Exemplary IMDs, such as implantable cardio defibrillators, pacemakers, and programmable neuro-stimulator pulse generators are herein referred to as "implantable medical devices" or IMDs. IMDs and in-line connectors are disclosed in U.S. Pat. No. 8,437,855, the contents of which are expressly incorporated herein by reference. The can housing 240 is a hermetically sealed device enclosing a power source and electronic circuitry for passing signals to the lead cable via the in-line connector 242.

FIG. 9B is an enlarged cross-sectional side view of the header 242 of FIG. 9A. As shown, the header has a bore 248 for receiving the in-line connector stack 242, which comprises a plurality of seal elements 250, conductive contact elements 252, and springs 148. The seal elements 250 are each configured to seal against the bore 248 of the header 242 and against the exterior surface of the lead cable 246. The spring contacts 148 are configured to bias against the electrical terminals 254 of the lead cable 246 to pass signals or current from inside the can housing 240, through the conductive contact elements 252, through the springs 148, to the electrical terminals 254, and to the electrode leads (not shown) located inside the lead cable 246 and extending to the various parts of the human body to provide electrical stimulation to the body tissues.

As shown, the various conductive contact elements 252 and springs utilized in the header 242 may be any one of the various connector housings and springs discussed elsewhere herein. Thus, the conductive contact elements 252 are each understood to be formed by joining two stamped housing sections 100 to form a housing groove for accommodating a spring 148 without any or without substantial machining to form the housing groove. The conductive contact elements 252 may each further include tapered outer shoulders formed by the skirt sections 112 of the stamped housing sections for sealing against, such as abutting, a shoulder of an adjacent seal element 250. Also shown in FIG. 9B is a holding ring 256 comprising a set screw 258 securing against the recessed section 260 of the lead cable 246 to secure the lead cable to the header.

FIG. 10A is a schematic partial cross-sectional partial side view of an in-line connector stack 270 comprising a plurality of connector components located inside an encapsulation layer 272, which is configured to retain or hold the in-line connector stack 270 away or outside of a header, for example the header 242 of FIGS. 9A and 9B. The encapsulated stack 274, which comprises the encapsulation layer 272 surrounding and retaining the in-line connector stack 270 outside of a header, is also shown with a mounting pin 276, which resembles the lead cable of FIG. 9B except it is solid and does not carry electrode leads. The mounting pin facilitates stacking of the various components for assembling purposes. The encapsulated stack 274 is assembled with a plurality of alternating seal elements 250 and conductive contact elements 252 each comprising a spring contact element 148 to form the in-line connector stack. The conductive contact elements 252 resemble one of the connector housings discussed elsewhere herein made from at least two stamped housing sections 100.

The encapsulated stack 274 allows the integrity of the in-line stack 270 to be tested outside of a header and before it is installed in an IMD. For example, conductive leads 278 may be attached to corresponding conductive contact elements 252 through windows 280 provided through the encapsulation layer 272, such as by welding or soldering the leads 278 to the interface 136 of the conductive contact elements 252 of two adjacent housing sections 100. Thus, the windows 280 on the encapsulation layer 272 as well as the conductor leads 278 are aligned with corresponding interfaces 136 of two adjacent housing elements 100. Test current or signals may be applied through the conductor leads 278 to test the operability of the in-line connector 270, such as to test current sent to the conductive contact housing 252 via the conductor leads. The stack can also be tested by holding the components that form the housing together with the spring contacts installed in the housing and inserting a lead to find insertion, removal, and frictional forces, and electrical performance. Exemplary encapsulated stacks and encapsulation layers but without the unique stamped features of the present device, system, and method are disclosed in U.S. Pat. No. 8,215,013, the contents of which are expressly incorporated herein by reference.

FIG. 10B is a cross-sectional end view of the encapsulated stack 274 of FIG. 10A taken along line 10B-10B.

Figure 10C:
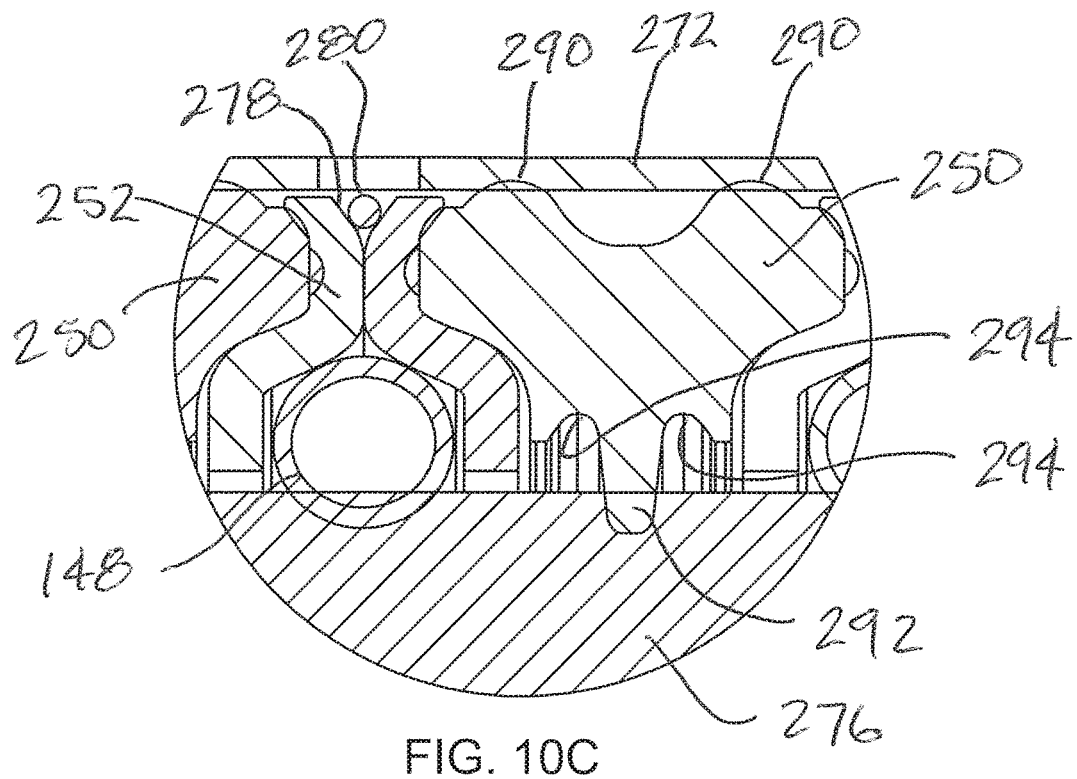
FIGS. 10C and 10D are enlarged views of the components of FIG. 10A.
Figure 10D:
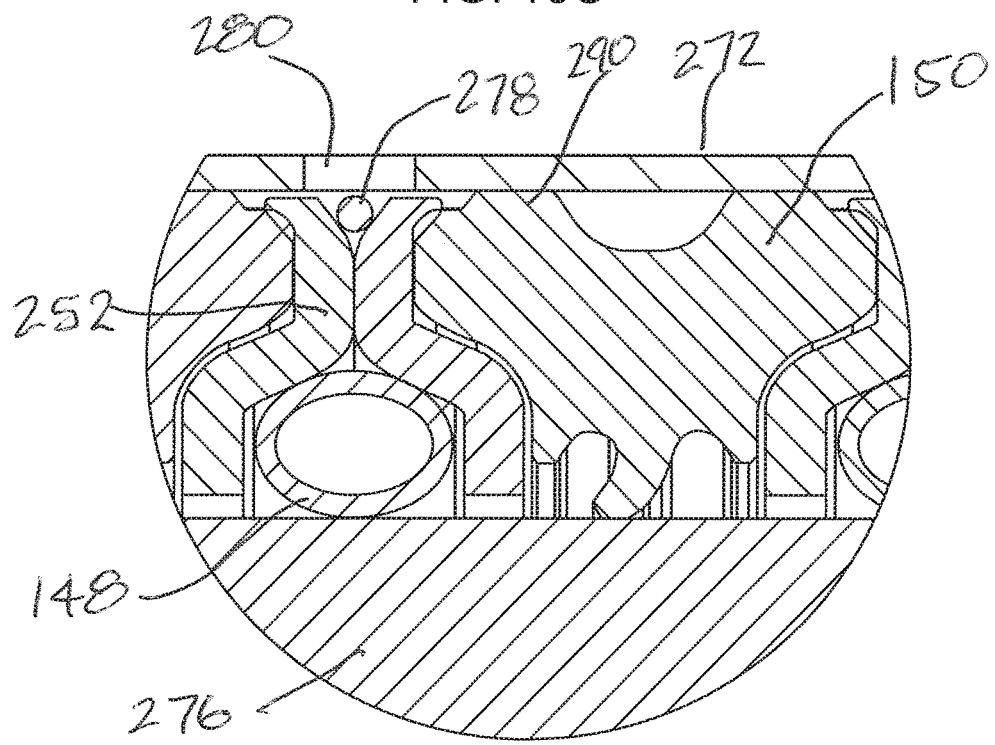

FIGS. 10C and 10D are blown up views of the encapsulated stack of FIG. 10A to show the various interference fit. For example, comparing the seal element 250 of FIG. 10C versus that of FIG. 10D, the outer seal section or shoulder 290 has a larger outside dimension than the inside diameter of the encapsulated layer 272. Similarly, the annular projection or lip 282 on the seal element 250 has a smaller inside diameter than the outside diameter of the installation pin 276, which has the approximately the same outside diameter as a lead cable (See, e.g., "246") of FIG. 9B. Thus, when installed, a seal is provided between the interface of the encapsulated layer and each seal element and the installation pin 276 and each sealing lip 292. Note that the seal lip 292 is positioned between two undercuts 294 formed in the bore of the seal element 250 to reduce the insertion force of the pin. The undercuts allow space for the seal lip to deflect, such as to reduce its total bending moment. Similarly, the inside diameter of the spring 148 is smaller than the pin outside diameter. Upon insertion of the pin, the spring will cant or deflect due to the relative sizes. Exemplary seal elements with undercuts to reduce insertion force are disclosed in EP application No. 09826890.7, which derived from PCT application No. PCT/US2009064527, the contents of which are expressly incorporated herein by reference.

FIG. 10D shows the same view but with the various components deflected due to the geometries of the various components.

Figure 11A:
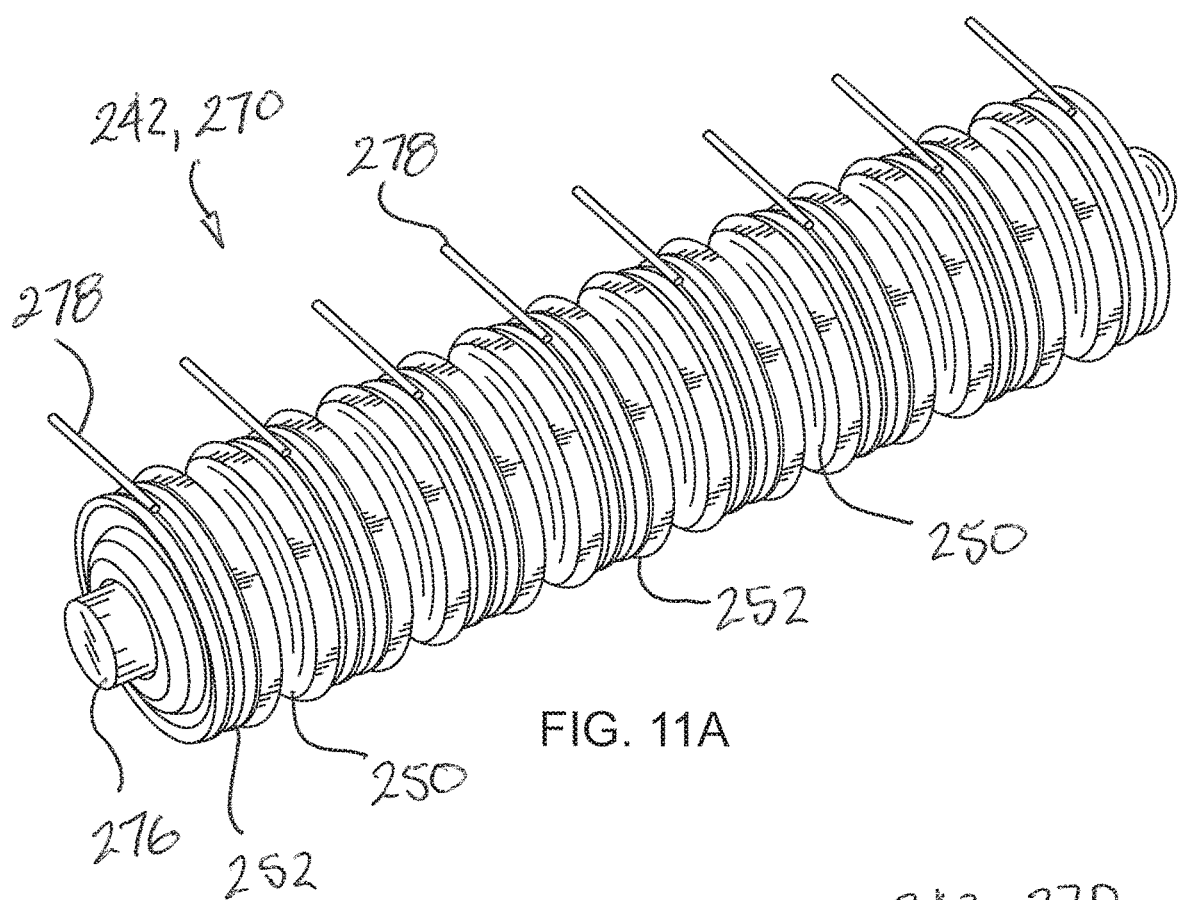
FIG. 11A is a perspective view of an in-line connector stack outside of a header and without an encapsulation layer.

FIG. 11A is a perspective view of the connector stack 242 or 270 of FIG. 9B or 10A but without an encapsulation layer or a header to better show the various connector components 250, 252, 278. As shown, there are eight conductor leads 278 and eight conductive contact elements 252. In other examples, there can be more than or fewer than eight conductor leads 278 and eight conductive contact elements 252.

Figure 11B:
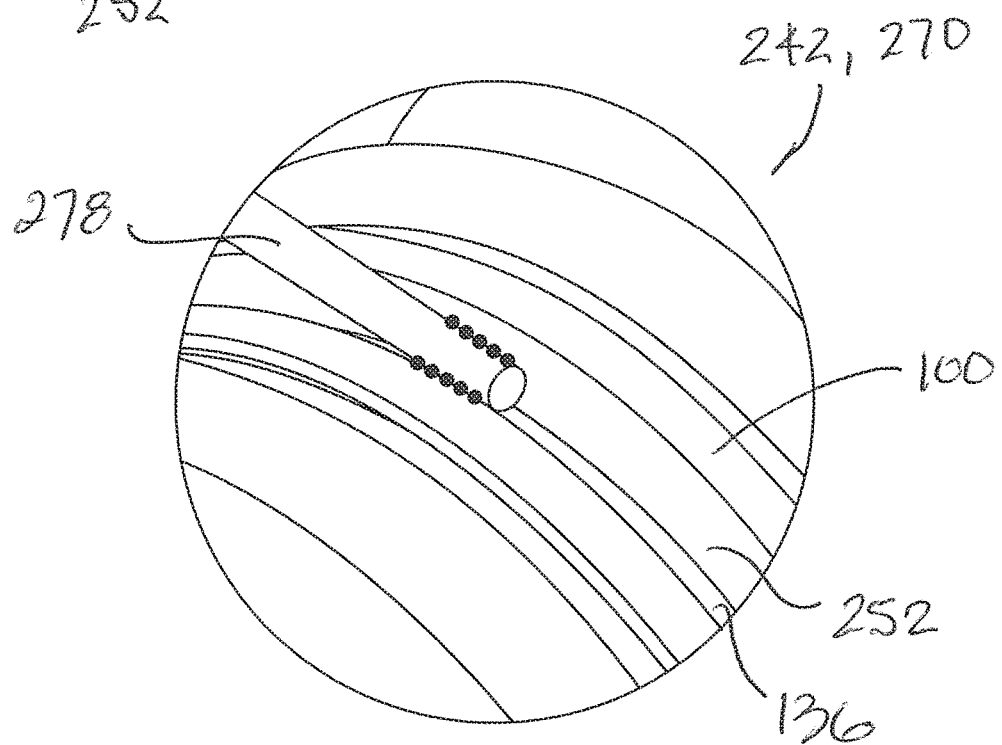
FIG. 11B is an enlarged view of FIG. 11A to show the connection of a conductor lead to one of the conductive contact elements.

FIG. 11B is an enlarged view of one of the connection points between the conductor lead 278 and one of the conductive contact elements 252. As shown, the conductor lead 278 is welded along an interface 136 of two adjacent stamped housing sections 100 of a conductive contact element 252.

Although limited embodiments of the housing sections, connector housings, and IMDs and their components have been specifically described and illustrated herein, many modifications and variations will be apparent to those skilled in the art. Furthermore, elements and features expressly discussed for one embodiment but not for another may equally apply provided the functionality or structures do not conflict. Thus, unless the context indicates otherwise, like features for one embodiment are applicable to another embodiment. Accordingly, it is to be understood that the housing sections, connector housings, and IMDs and their components constructed according to principles of the disclosed device, system, and method may be embodied other than as specifically described herein. The disclosure is also defined in the following claims.

What is claimed is:

1. A method for making a connector housing, the method comprising:
    forming a first housing section, said first housing section comprising an upper flange with a planar surface and an outer perimeter, a lower flange, a skirt section located between the upper flange and the lower flange, and said lower flange having a perimeter defining an opening;
    forming a second housing section, said second housing section comprising an upper flange with a planar surface and an outer perimeter, a lower flange, a skirt section located between the upper flange and the lower flange, and said lower flange having a perimeter defining an opening;
    attaching said first housing section to said second housing section to form a connector housing by abutting the planar surface of the first housing section and the planar surface of the second housing section to define a planar parting line that originates from an interior location of the connector housing to an exterior-most location of the connector housing where the two outer perimeters are exposed, said connector housing comprising a common bore with the opening of the first housing section at a first end of the common bore and the opening of the second housing section at a second end of the common bore, and a housing groove comprising a groove bottom is formed by the first housing section and the second housing section;
    placing a spring inside the housing groove; and
    wherein the skirt section of the first housing section is located on a first side of the parting line and the skirt section of the second housing section is located on a second side of the parting line.

2. The method of claim 1, wherein the spring is a canted coil spring, a garter spring, a cantilever spring, or a ribbon spring.

3. The method of claim 1, wherein the first housing is stamped from a material made from steel, stainless steel, copper, gold, a stainless steel and nickel-based alloy, platinum-iridium, or titanium.

4. The method of claim 1, wherein said skirt section of said first housing section and said skirt section of said second housing section form said groove bottom with two tapered surfaces having an interface located therebetween.

5. The method of claim 1, wherein the first housing section has a path for terminating an electrical lead.

6. The method of claim 1, wherein the first housing section is made from a multi-layer material with a base metal layer and one or more cladding or plating over layers.

7. The method of claim 1, further comprising abutting a canted coil spring against the skirt section of the first housing section and against the skirt section of the second housing section.

8. The method of claim 7, wherein the canted coil spring has a smaller inside diameter than diameters of the two openings of the bore.

9. The method of claim 8, further comprising the step of projecting a pin through the bore.

10. The method of claim 9, wherein the pin has a groove and the spring is located in the groove of the pin.

11. The method of claim 1, wherein the first housing section is formed by stamping and wherein the second housing section is formed by stamping.

12. The method of claim 11, wherein the first housing section and the second housing section are generally symmetrical about an interface between the first housing section and the second housing section.

13. The method of claim 11, wherein the first housing section is attached to the second housing section by welding, bonding, using tabs, using detents, or using set screws.

14. The method of claim 11, wherein the upper flange of the first housing section comprises a planar surface and the upper flange of the second housing section comprises a planar surface, and wherein the planar surfaces abut and the outer perimeters are exposed.

15. The method of claim 14, wherein each of the skirt sections is tapered and the spring contacts the tapered surface of the first and second housing sections.

16. A method for making a connector housing, the method comprising:
    forming a first housing section, the first housing section comprising an upper flange with a first side, an opposing second side, an outer perimeter edge between the first side and the second side, a lower flange, a skirt section located between the upper flange and the lower flange, and the lower flange having a perimeter defining an opening;
    forming a second housing section, the second housing section comprising a first side, an opposing second side, an outer perimeter edge, and an inside diameter defining an opening;
    attaching the first housing section to the second housing section to form a connector housing by abutting the second side of the first housing section and the second side of the second housing section so that a parting line that originates from an interior location of the connector housing to an exterior-most location of the connector housing extends between the two second sides and the parting line is exposed proximate the outer perimeter edges of the first and second housing sections, and a housing groove comprising a groove bottom and two sidewall is formed by the first housing section and the second housing section;

placing a spring inside the housing groove; and wherein the skirt section of the first housing section is located on a first side of the parting line and the outer perimeter edge of the second housing section is located on a second side of the parting line.

17. The method of claim 16, wherein the first housing section is formed by stamping.

18. The method of claim 17, wherein the parting line is generally planar.

19. The method of claim 17, further comprising placing a pin through at least one of the opening of the first housing section and the opening of the second housing section so that the spring biases against the pin.

20. The method of claim 19, wherein the pin comprises a pin groove and wherein the spring is located in the pin groove.

21. The method of claim 19, wherein the first housing section and the second housing section are substantially symmetrical about the parting line.

22. The method of claim 17, further comprising an exterior groove formed at the parting line proximate the outer perimeter edges of the first and second housing sections.

23. The method of claim 17, wherein the second housing section has a generally planar surface extending between the outer perimeter edge and the inside diameter.

24. The method of claim 17, wherein the second housing section further comprises a lower flange, a skirt section located between the upper flange and the lower flange, and the lower flange having the inside diameter.

* * * * *